(12) United States Patent
Yanagihara et al.

(10) Patent No.: US 9,154,062 B2
(45) Date of Patent: Oct. 6, 2015

(54) ELECTRIC POWER TOOL

(75) Inventors: Kenya Yanagihara, Anjo (JP);
Yoshitaka Ichikawa, Anjo (JP);
Motohiro Omura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 131 days.

(21) Appl. No.: 13/983,716

(22) PCT Filed: Feb. 7, 2012

(86) PCT No.: PCT/JP2012/052703
§ 371 (c)(1),
(2), (4) Date: Aug. 5, 2013

(87) PCT Pub. No.: WO2012/108415
PCT Pub. Date: Aug. 16, 2012

(65) Prior Publication Data
US 2013/0314007 A1 Nov. 28, 2013

(30) Foreign Application Priority Data
Feb. 10, 2011 (JP) ................. 2011-027803

(51) Int. Cl.
*H02P 1/00* (2006.01)
*H02P 3/00* (2006.01)
*H02P 5/00* (2006.01)
(Continued)

(52) U.S. Cl.
CPC .. *H02P 6/002* (2013.01); *B25F 5/00* (2013.01)

(58) Field of Classification Search
CPC ........................................ B25F 5/00
USPC .......................................... 318/139
See application file for complete search history.

(56) References Cited

U.S. PATENT DOCUMENTS

| 5,738,177 | A | 4/1998 | Schell et al. | |
| 6,043,624 | A * | 3/2000 | Masaki et al. | ............. 318/723 |
| 6,326,748 | B1 | 12/2001 | Moroto et al. | |

(Continued)

FOREIGN PATENT DOCUMENTS

| CN | 1754303 A | 3/2006 |
| CN | 1762089 A | 4/2006 |

(Continued)

OTHER PUBLICATIONS

Written Opinion of the International Searching Authority issued in International Patent Application No. PCT/JP2012/052703 dated Mar. 13, 2012 (w/translation).

(Continued)

*Primary Examiner* — Erick Glass
(74) *Attorney, Agent, or Firm* — Oliff PLC

(57) ABSTRACT

An electric power tool is provided with a three-phase brushless motor that drives a tool and a motor driver that drives the three-phase brushless motor with square voltage waves. The motor driver is able to set a conduction angle to a value that is equal to or more than 130 degrees but not more than 180 degrees, and especially to change the conduction angle among at least two values that are equal to or more than 130 degrees but not more than 180 degrees. In this configuration, it may be preferable that the conduction angle is set to a larger value as a load applied to the tool becomes smaller. On the other hand, it may be also preferable that the conduction angle is set to a larger value as a load applied to the tool becomes smaller.

17 Claims, 17 Drawing Sheets

(51) Int. Cl.
*H02P 6/00* (2006.01)
*B25F 5/00* (2006.01)

(56) References Cited

U.S. PATENT DOCUMENTS

| | | |
|---|---|---|
| 2003/0121685 A1 | 7/2003 | Yamamoto |
| 2003/0174449 A1 | 9/2003 | Yamamoto |
| 2006/0039807 A1 | 2/2006 | Hamaoka et al. |
| 2006/0082339 A1 | 4/2006 | Hamaoka et al. |
| 2006/0113096 A1 | 6/2006 | Yamamoto |
| 2008/0246431 A1* | 10/2008 | Koji et al. .................. 318/801 |
| 2010/0123359 A1 | 5/2010 | Nishikawa |
| 2011/0127941 A1 | 6/2011 | Hirabayashi et al. |
| 2011/0279070 A1 | 11/2011 | Tanaka et al. |
| 2012/0176101 A1* | 7/2012 | Skinner ....................... 323/205 |

FOREIGN PATENT DOCUMENTS

| | | |
|---|---|---|
| CN | 101733740 A | 6/2010 |
| JP | A-9-155757 | 6/1997 |
| JP | A-2000-308268 | 11/2000 |
| JP | A-2003-200363 | 7/2003 |
| JP | 2003-266334 A | 9/2003 |
| JP | A-2004-173471 | 6/2004 |
| JP | A-2008-264963 | 11/2008 |
| JP | B2-4341266 | 10/2009 |
| JP | A-2010-120120 | 6/2010 |
| JP | A-2010-201516 | 9/2010 |
| JP | A-2011-654 | 1/2011 |
| JP | A-2011-10431 | 1/2011 |
| JP | A-2011-110668 | 6/2011 |
| WO | WO 2010/082473 A1 | 7/2010 |

OTHER PUBLICATIONS

Chinese Office Action issued in Chinese Patent Application No. 201280008149.3 on Oct. 8, 2014 (with translation).

Mar. 13, 2012 International Search Report issued in International Patent Application No. PCT/JP2012/052703 (with translation).

Apr. 28, 2015 Office Action issued in Japanese Application No. 2012-556893.

* cited by examiner

Conduction Angle = 120°

Conduction Angle = 150°

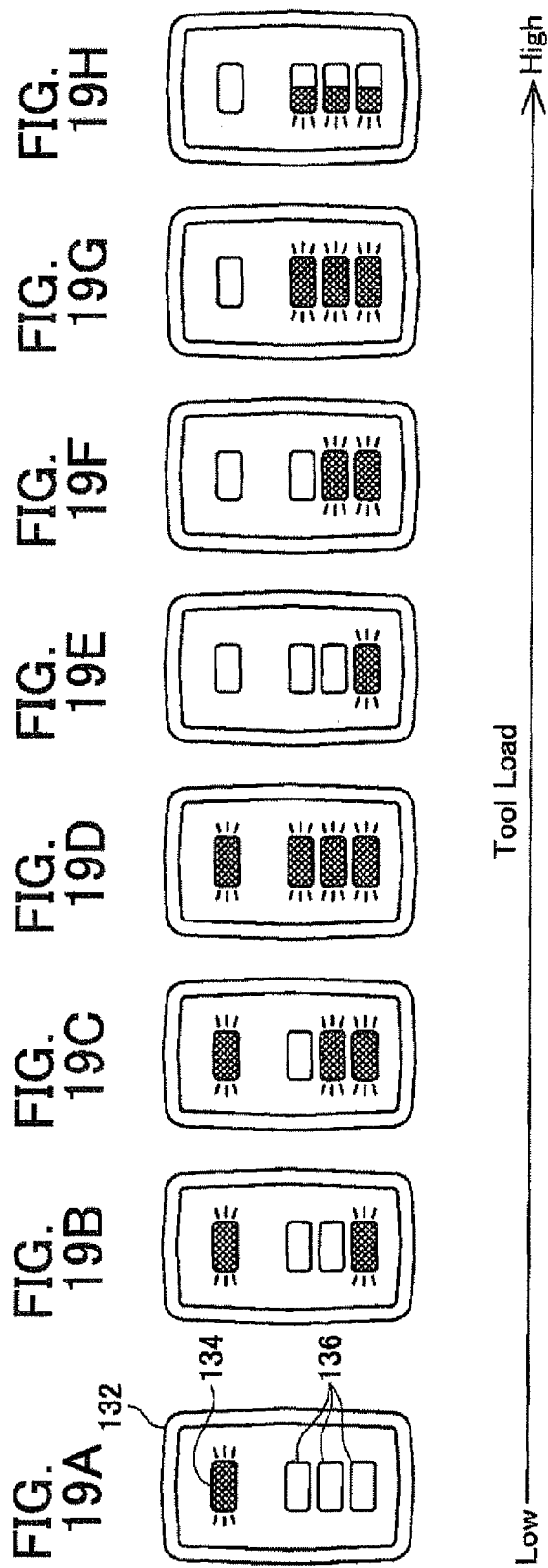

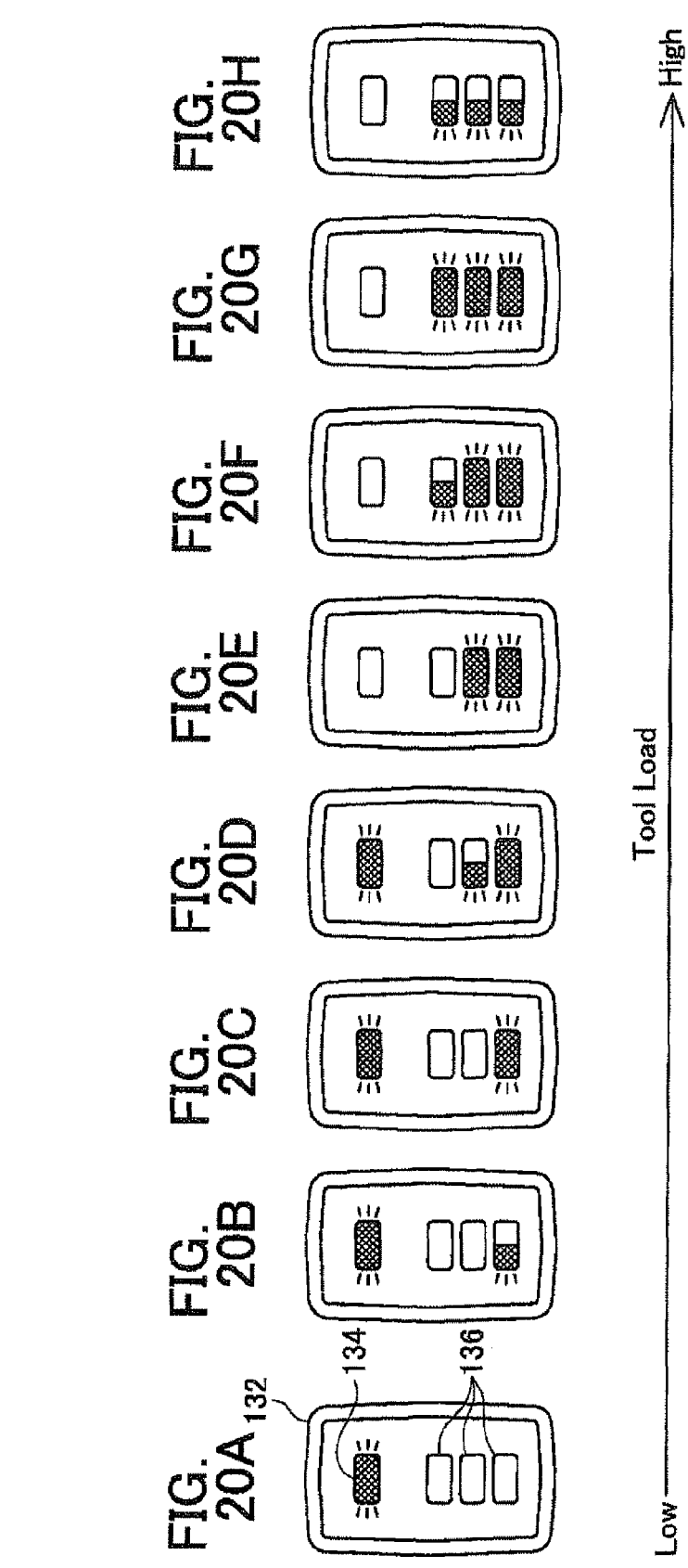

ELECTRIC POWER TOOL

TECHNICAL FIELD

The present disclosure relates to an electric power tool, especially to an electric power tool including a three-phase brushless motor.

BACKGROUND ART

JP 2003-200363 A discloses an electric power tool. The electric power tool includes a three-phase brushless motor and a motor driver that drives the three-phase brushless motor.

SUMMARY OF INVENTION

Technical Problem

An electric power tool is used in various types of work and required to perform an operation in accordance with the work. In case of an electric circular saw, for example, its tool (blade) needs to be driven at high speed in order to cut a thin plate and needs to be driven with a high torque in order to cut a thick plate. Unfortunately, these operations conflict with each other and therefore cannot easily achieve both.

The technology disclosed herein solves this problem. In other words, technology capable of balancing different features of an electric power tool is disclosed.

Solution to Technical Problem

A conventional electric power tool has a conduction angle of its three-phase brushless motor set at 120 degrees. In the present technology, however, the conduction angle of a three-phase brushless motor is set at an angle equal to or greater than 130 degrees but not more than 180 degrees. Increasing the conduction angle reduces the output torque of a motor and increases the rotational speed per unit time of the motor (simply referred to as "rotational speed," hereinafter). Thus, an electric power tool with high-rotation characteristics can be realized. Integrating this electric power tool with the conventional electric power tool having the 120-degree conduction angle enables the use of the different features thereof in accordance with the work.

Based on this knowledge, it is preferred that the electric power tool has a three-phase brushless motor that drives a tool, and a motor driver that drives the three-phase brushless motor with square voltage waves. It is also preferred that the motor driver be capable of setting a conduction angle at an angle equal to or greater than 130 degrees but not more than 180 degrees.

In the electric power tool described above, the conduction angle may be fixed to a value equal to or greater than 130 degrees but not more than 180 degrees. It is also preferred that the motor driver be capable of changing the conduction angle of the three-phase brushless motor between at least two values from 120 degrees to 180 degrees. According to this embodiment, different features can be achieved in one electric power tool.

BRIEF DESCRIPTION OF DRAWINGS

FIGS. 15A and 15B show an example of how a conduction angle of a three-phase brushless motor is displayed by the display unit, wherein FIG. 15A shows the display unit obtained when the conduction angle is 150 degrees, and FIG. 15B the display unit obtained when the conduction angle is 120 degrees.

FIGS. 19A to 19H show another example of how the load applied to the tool is displayed by the display unit, the load displayed by the display unit increasing gradually from the state shown in FIG. 19A to the state shown in FIG. 19H.

FIGS. 20A to 20H show another example of how the load applied to the tool is displayed by the display unit, the load displayed by the display unit increasing gradually from the state shown in FIG. 20A to the state shown in FIG. 20H.

EMBODIMENTS OF THE INVENTION

Figure 1:
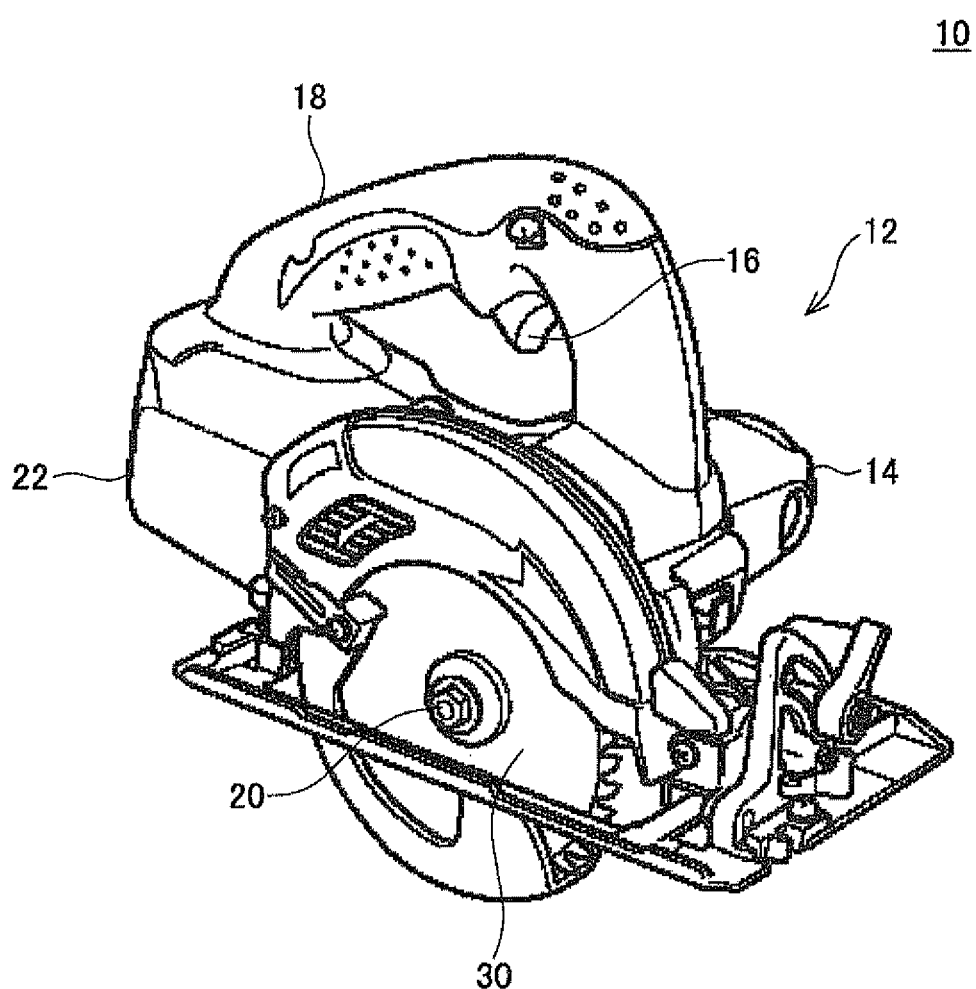
FIG. 1 is an external view of a circular saw according to Embodiment 1.

In an embodiment of the present technology, it is preferred that a motor driver drives a three-phase brushless motor with square voltage waves at a conduction angle set at a value that is equal to or more than 130 degrees but not more than 180 degrees. According to this configuration, the tool can be driven at higher speed than a conventional electric power tool with the conduction angle set at 120 degrees.

In another embodiment of the present technology, it is preferred that the motor driver changes the conduction angle between at least two values that are equal to or more than 120 degrees but not more than 180 degrees. According to this configuration, the tool can be driven at high speed by increasing the conduction angle, and the tool can be driven with high torque by reducing the conduction angle.

In the aspect described above, the conduction angle may be changed manually by a user or automatically by the electric power tool. In the latter case, it is preferred that the conduction angle be changed in accordance with a load applied to a tool. When changing the conduction angle in accordance with a load applied to the tool, generally the following two methods can favorably be adopted.

In the first method, the lower the load applied to the tool, the greater the value at which the conduction angle is set. The rotational speed of the motor rises as an output torque of the motor declines. Therefore, when the electric power tool is used in light-duty work and a low load is applied to the tool, it is preferred that the conduction angle be increased so that the electric power tool can be operated preferentially with the rotational speed of the motor. On the other hand, when the electric power tool is used in a heavy-duty work and a large load is applied to the tool, it is preferred that the conduction angle be reduced so that the electric power tool can be operated preferentially with the output torque of the motor.

In the second method, the greater the load applied to the tool, the greater the value at which the conduction angle is set. According to the verification by the inventors, when a small load is applied to the tool, setting the conduction angle at a large value can improve the electrical efficiency of the electric power tool. When a large load is applied to the tool, setting the conduction angle at a small value can improve the electrical efficiency of the electric power tool. Therefore, the second method enables energy-saving operation in which the electrical efficiency of the electric power tool is taken into primary consideration.

According to one aspect of the present technology, the motor driver is capable of selecting between the two modes. In other words, the motor driver can be configured to select between "a high power mode where the conduction angle is set to a larger value as a load applied to the tool becomes smaller" and "an energy saving mode where the conduction angle is set to a larger value as a load applied to the tool becomes greater." In this case, the motor driver can select the two modes in accordance with the charge level (remaining power) of the battery supplying electric power to the motor. In other words, it is preferred that the motor be operated in the "high power mode" while the battery is charged sufficiently, and that the motor be operated in the "energy saving mode" when the charge level of the battery drops to a predetermined level.

According to one aspect of the present technology, it is preferred that the electric power tool further has a first detector that detects an index corresponding to a load applied to the tool. In this case, the motor driver preferably changes the conduction angle in accordance with a value detected by the first detector. Examples of the index corresponding to a load applied to the tool include motor current, motor rotational speed, battery current, and battery voltage. As is well known, in a three-phase brushless motor, the greater a load applied to the motor, the greater the motor current is and the lower the motor rotational speed. At this moment, the battery current increases in response to the motor current, and the battery voltage drops as the battery current increases. In addition, a distortion that is generated on the tool or a rotational axis connected to the tool can be the index corresponding to a load applied to the tool.

In the aspect described above, it is preferred that the motor driver is capable of changing the conduction angle at least between a first angle and a second angle, stores a first threshold value and a second threshold value for the index, changes the conduction angle to the second angle in accordance with a magnitude relationship between the value detected by the first detector and the first threshold value when the conduction angle is set at the first angle, and changes the conduction angle to the first angle in accordance with a magnitude relationship between the value detected by the first detector and the second threshold value when the conduction angle is set at the second angle. In other words, it is preferred to apply different threshold values to determine whether the conduction angle needs to be changed from the first angle to the second angle and whether the conduction angle needs to be changed from the second angle to the first angle. As a result, the process for changing the conduction angle can be provided with hysteresis characteristics and the conduction angle can be prevented from being repeatedly changed unnecessarily when the detected index finely fluctuates around the threshold values.

In one aspect of the present technology, it is preferred that the electric power tool further has a second detector that detects a temperature of the three-phase brushless motor or the motor driver, In this case, it is preferred that the motor driver changes the conduction angle in accordance with a value detected by the second detector. The current flowing through the motor increases as the conduction angle increases, resulting in an increase in the temperatures of the motor and the motor driver. For this reason, monitoring the temperature of the motor or the motor driver and changing the conduction angle based on this temperature can prevent the motor and the motor driver from overheating. For instance, the conduction angle may be reduced when the temperature of the motor or the motor driver deviates from the acceptable range.

In the aspect described above, it is preferred that the motor driver is capable of changing the conduction angle at least between a first angle and a second angle, stores a third threshold value and a fourth threshold value for the temperature, changes the conduction angle to the second angle if the value detected by the second detector is higher than the third threshold value when the conduction angle has been set at the first value, and changes the conduction angle to the first angle if the value detected by the second detector is lower than the fourth threshold value when the conduction angle has been set at the second value. In other words, it is preferred to apply different threshold values to determine whether the conduction angle needs to be changed from the first angle to the second angle and whether the conduction angle needs to be changed from the second angle to the first angle. As a result, the process for changing the conduction angle can be provided with hysteresis characteristics and the conduction angle can be prevented from being repeatedly changed unnecessarily when the detected index finely fluctuates around the threshold values.

In one aspect of the present technology, when the motor driver makes the conduction angle larger, it is preferred that the motor driver advances a timing to start conduction to an earlier timing while maintaining the conduction angle, and then increases the conduction angle while maintaining the timing to start conduction. According to this method, the rotational speed of the motor can be inhibited from fluctuating drastically when the motor driver increases the conduction angle.

In one aspect of the present technology, when the motor driver makes the conduction angle smaller, it is preferred that the motor driver reduces the conduction angle while maintaining the timing to start conduction, and then postpones the timing to start conduction to a later timing while maintaining the conduction angle.

In one aspect of the present technology, it is preferred that the motor driver changes a lead angle in accordance with the change in the conduction angle. This is because the lead angle for achieving high efficiency and high power varies depending on the conduction angle. It is preferred that a specific value of the lead angle with respect to each conduction angle be set appropriately in accordance with the structure, function, and demand characteristics of the electric power tool.

In one aspect of the present technology, a III-V semiconductor transistor can be employed as a switching element of the motor driver. Due to its high off-state withstand voltage and low on-resistance, the III-V semiconductor transistor is suitable for the electric power tool in which large current is applied to the motor thereof.

In one aspect of the present technology, it is preferred that the electric power tool further has a notifier that selectively executes a notification operation corresponding to the conduction angle set by the motor driver. According to this configuration, the user can know at which conduction angle the three-phase brushless motor of the electric power tool is driven. The user then can efficiently perform a task by adjusting the load applied to the tool while keep driving the three-phase brushless motor at a desired conduction angle.

In the aspect described above, it is preferred that the notifier uniquely identifies the conduction angle set by the motor driver, regardless of the conduction angle that is actually set. In this configuration, the conduction angle that is actually set by the motor driver should normally match the conduction angle notified by the notifier. However, when there is a problem in the motor driver or the notifier, the conduction angle that is actually set by the motor driver does not match the conduction angle notified by the notifier. Thus, when the conduction angles do not match, it can be determined that there is a problem in the motor driver or the notifier. Accordingly, the user can immediately stop the use of the electric power tool and fix the problem promptly.

In the aspect described above, it is preferred that the electric power tool further has a first detector that detects an index corresponding to a load applied to the tool. In this case, it is preferred that the motor driver changes the conduction angle in accordance with a value detected by the first detector, and that the notifier selects a notification operation to execute, in accordance with the value detected by the first detector. For example, for the value detected by the first detector, the motor driver and the notifier each can store at least one threshold value. The motor driver can change the conduction angle based on the magnitude relationship between the value detected by the first detector and the stored threshold value. In this case, it is preferred that the notifier execute a notification operation corresponding to the conduction angle to be set by the motor driver, independently of the motor driver, based on the magnitude relationship between the value detected by the first detector and the stored threshold value. In this configuration, the operations of the motor driver and the notifier are determined independently based on the detection result obtained by the common detector. Therefore, when both of the operations do not correspond to each other, the user can determine that there is a problem in either the motor driver or the notifier.

In each of the aspects where the electric power tool has the notifier as described above, it is preferred that the electric power tool further has a battery that supplies electric power to the three-phase brushless motor, and a third detector that detects remaining power of the battery. In this case, it is preferred that the notifier is capable of further executing a notification operation corresponding to the remaining power of the battery detected by the third detector. Because the user can know the remaining power of the battery, the user can prevent the battery from suddenly running out.

In one aspect of the present technology, it is preferred that the notifier executes the notification operation corresponding to the selected conduction angle, while the motor is driven, and execute the notification operation corresponding to the remaining power of the battery when the driven motor is stopped. This configuration can prevent the user from misunderstanding the information notified by the notifier. In addition, it is preferred that the notifier further executes a notification operation indicative of a magnitude of the load applied to the tool while the motor is driven.

In one aspect of the present technology, it is preferred that the notifier has at least one illuminator. The user, therefore, can visually acknowledge the information indicated by the notifier. Note that the notifier may have a device such as a sound source, a vibration source, or a liquid crystal panel in addition to or in place of the at least one illuminator.

In one aspect of the present technology, it is preferred that the electric power tool further has a three-phase brushless motor for driving a tool, a motor driver for driving the three-phase brushless motor with square voltage waves, and a notifier. In this case, it is preferred that the motor driver is capable of selectively executing a first mode where the motor driver outputs square voltage waves having a first relationship with respect to a rotational position of the three-phase brushless motor and a second mode where the motor driver outputs square voltage waves having a second relationship with respect to the rotational position of the three-phase brushless motor. It is also preferred that the notifier selectively execute a notification operation corresponding to a mode selected by the motor driver.

Embodiment 1

A circular saw 10 of Embodiment 1 is described with reference to the drawings. As shown in FIG. 1, the circular saw 10 has a main body 12, a saw blade 30, and a battery pack 22. The saw blade 30 is a disc-shaped blade and is used for cutting a workpiece (wood). The battery pack 22 is a power source for supplying electric power to the main body 12 and is capable of being attached to and detached from the main body 12. The battery pack 22 is a DC power source having a plurality of lithium ion cells embedded therein and a nominal voltage of 18 volts. Note that the type of the battery pack 22 or the nominal voltage are not particularly limited thereto, The main body 12 has a motor 14 for driving the saw blade 30, a trigger switch 16 for starting the motor 14, a grip 18 for the user to grip, and a tool shaft 20 holding the saw blade 30. The user can supply electric power from the battery pack 22 to the motor 14 by operating the trigger switch 16. As a result, the motor 14 is driven to rotate the saw blade 30 and the tool shaft 20.

Figure 2:
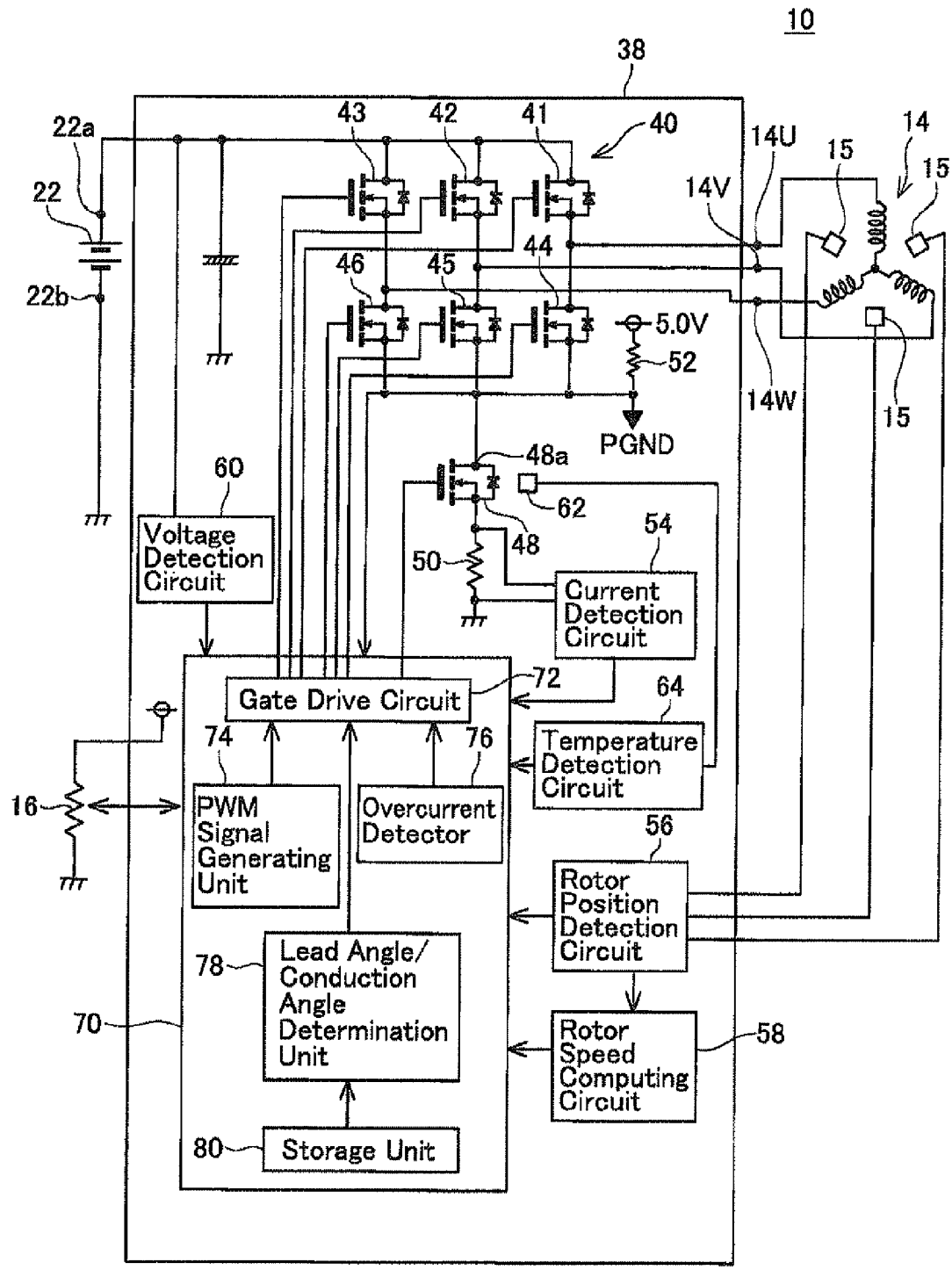
FIG. 2 is a circuit diagram showing an electrical structure of the circular saw according to Embodiment 1.

FIG. 2 is a circuit diagram showing an electrical configuration of the circular saw 10. As shown in FIG. 2, the circular saw 10 mainly has the motor 14 and a motor driver 38 for controlling the motor 14. The motor 14 is a three-phase brushless motor and has a rotor (not shown) with a permanent magnet and a stator (not shown) with a three-phase coil, A U-phase terminal 14U, V-phase terminal 14V, and W-phase terminal 14W of the motor 14 are electrically connected to the battery pack 22 via the motor driver 38. The motor 14 is also provided with a position sensor 15 that detects the position of the rotor. The position sensor 15, too, is connected to the motor driver 38.

Figure 3:
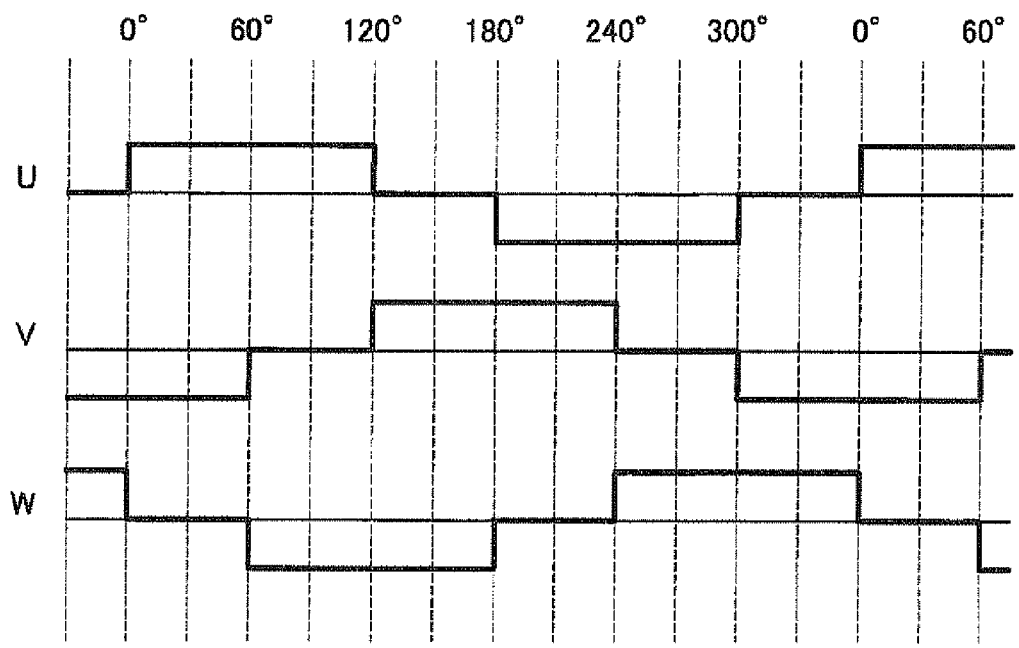
FIG. 3 is a diagram showing a voltage waveform of each phase terminal obtained when a conduction angle is 120 degrees.
Figure 4:
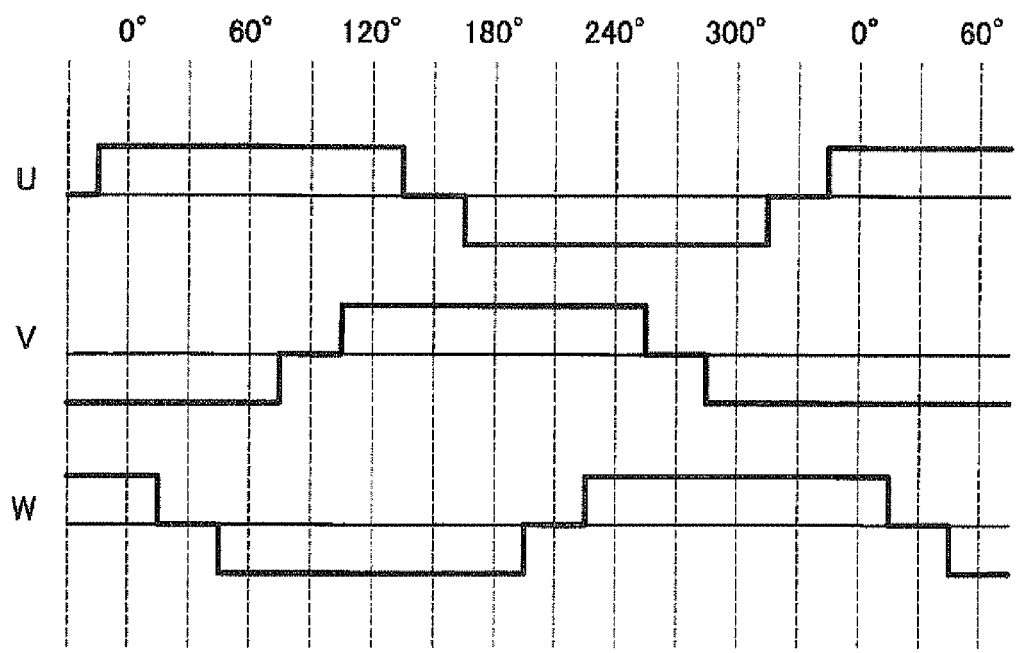
FIG. 4 is a diagram showing a voltage waveform of each phase terminal obtained when the conduction angle is 150 degrees.

The motor driver 38 selectively connects each of the phase terminals 14U, 14V, 14W of the motor 14 to a positive electrode 22a or a negative electrode 22b of the battery pack 22 in accordance with the detected rotational position of the rotor. The motor driver 38 consequently controls a voltage applied to each of the phase terminals 14U, 14V, 14W in accordance with the rotational position of the rotor. FIGS. 3 and 4 each show a voltage waveform of each of the phase terminals 14U, 14V, 14W controlled by the motor driver 38. The motor driver 38 drives the motor 14 with rectangular waves. Thus, as shown in FIGS. 3 and 4, the voltage applied to each of the phase terminals 14U, 14V, 14W changes in the shape of a rectangular wave in accordance with the rotational position of the rotor. FIG. 3 shows a voltage waveform obtained when the conduction angle is set at 120 degrees. FIG. 4 shows a voltage waveform obtained when the conduction angle is set at 150 degrees. In this manner, the motor driver 38 can change the conduction angle between 120 degrees and 150 degrees, the conduction angle being used for driving the motor 14 with square voltage waves.

Figure 5:
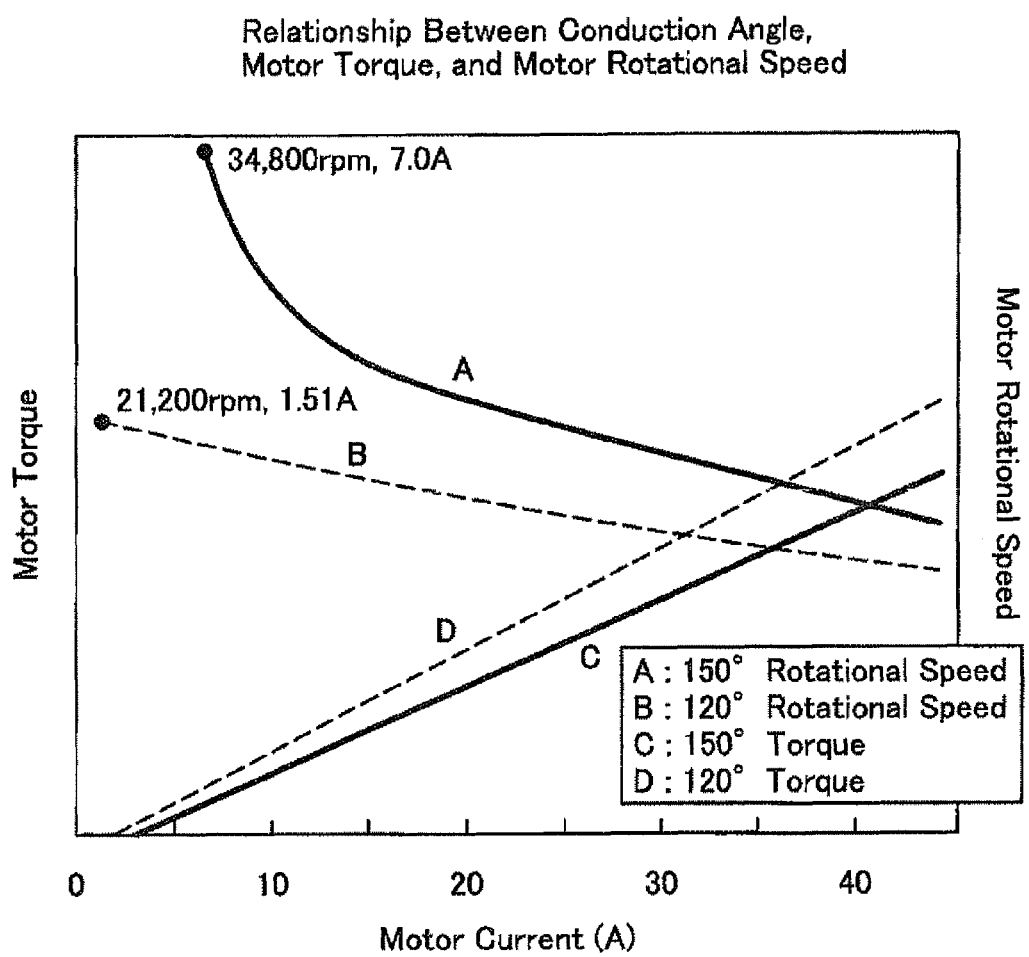
FIG. 5 is a graph showing a relationship between the conduction angle, motor torque, and motor rotational speed, wherein line A represents the motor rotational speed obtained when the conduction angle is 150 degrees, line B the motor rotational speed obtained when the conduction angle is 120 degrees, line C the motor torque obtained when the conduction angle is 150 degrees, and line D the motor torque obtained when the conduction angle is 120 degrees.

As shown in FIG. 5, the operating characteristics of the motor 14 change significantly depending on the conduction angle. Particularly, when the conduction angle is increased, output torques (C, D) of the motor 14 drop, and rotational speeds (A, B) of the motor 14 increase. In the circular saw 10 of the present embodiment, the conduction angle is set at 150 degrees when a small load is applied to the saw blade 30, and the conduction angle is set at 120 degrees when a large load is applied to the saw blade 30. Thus, when cutting a thin plate, the electric power tool is operated with a 150-degree conduction angle and preferentially with the rotational speed of the motor 14. In this case, the thin plate can be cut within a short period of time because the saw blade 30 is driven at high speed. When cutting a thick plate, on the other hand, the electric power tool is operated with a 120-degree conduction angle and preferentially with the output torques of the motor 14. In this case, a relatively thick plate can be cut reliably because the saw blade 30 is driven with a high torque.

In the present embodiment, the conduction angle is changed between 120 degrees and 150 degrees; however, the conduction angle may be changed between other angles. In addition, the conduction angle may be changed not only between two values but also among three or more values. It is preferred that the conduction angle be changed at least between two values, i.e., between 120 degrees and 180 degrees.

As shown in FIG. 5, because the rotational speed of the motor 14 varies in accordance with the conduction angle, changing the conduction angle leads to a change in the rotational speed of the motor 14. Significantly changing the conduction angle within a short period of time leads to a significant fluctuation of the rotational speed of the motor 14, causing strong discomfort to the user. For this reason, it is preferred that the conduction angle be gradually changed over a certain period of time.

Figure 6:
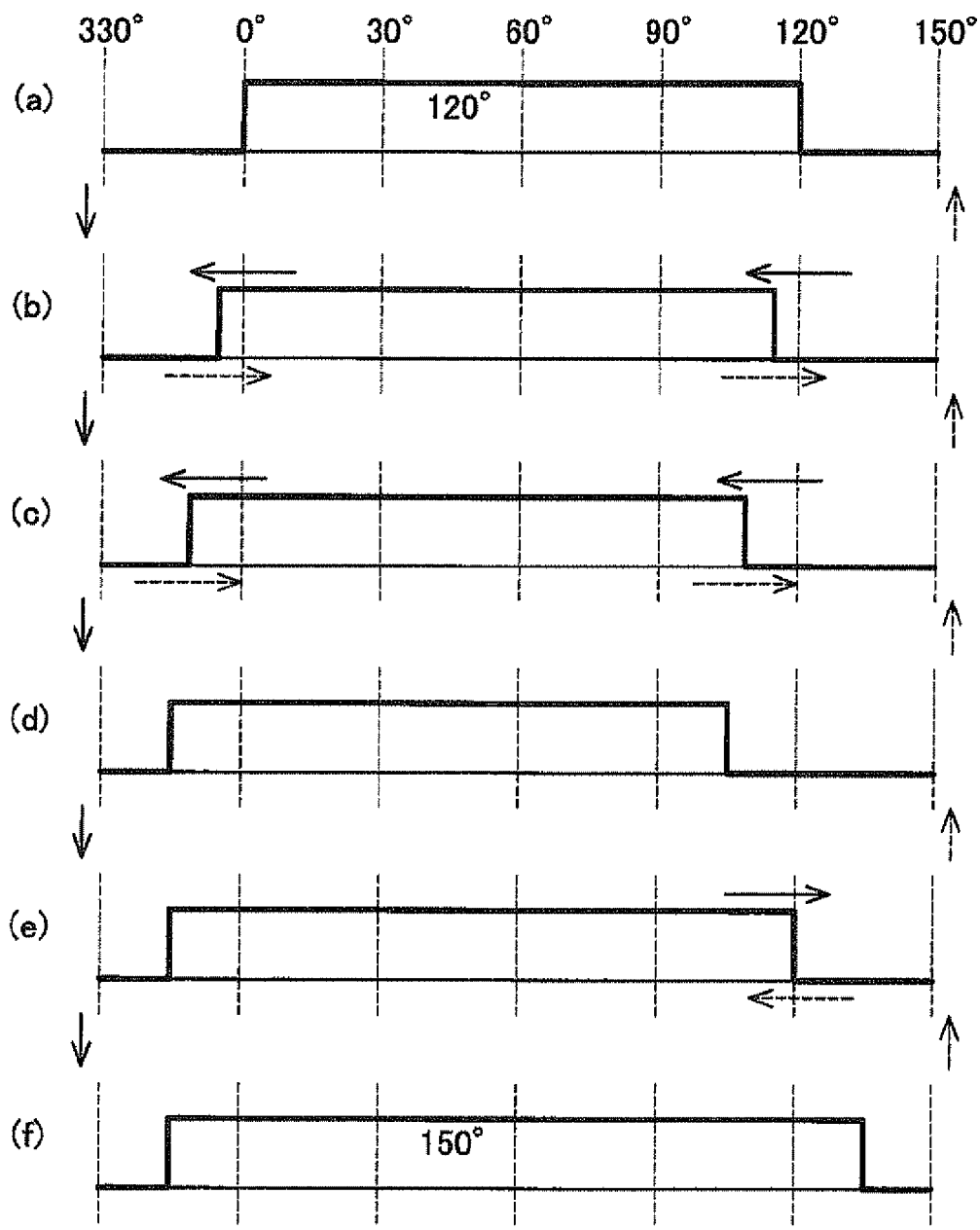
FIG. 6 is a diagram showing how the conduction angle changes gradually from 120 degrees to 150 degrees.

A procedure for changing the conduction angle in the present embodiment is now described with reference to FIG. 6. As shown in FIG. 6, when changing the conduction angle significantly from 120 degrees to 150 degrees, the waveform of voltage to be applied to the motor 14 is changed from (a) to (f). In other words, the motor driver 38 first gradually advances a timing to start conduction while maintaining the conduction angle (a→b→c→d), and then gradually increases the conduction angle while maintaining the timing to start conduction (d→e→f). On the other hand, when reducing the conduction angle from 150 degrees to 120 degrees, the waveform of voltage to be applied to the motor 14 is changed reversely from (f) to (a). In other words, the motor driver 38 first gradually reduces the conduction angle while maintaining the timing to start conduction (f→e→d), and thereafter gradually postpones the timing to start conduction while maintaining the conduction angle (d→c→b→a). This procedure can prevent drastic fluctuation in the rotational speed of the motor 14.

As described above, the motor driver 38 changes the conduction angle in accordance with a load applied to the tool. In this case, the motor driver 38 can detect an index corresponding to the load and then change the conduction angle in accordance with the detected index. Examples of the index corresponding to the load applied to the tool include a current value of the motor 14 and the rotational speed of the motor 14. Moreover, because an output voltage of the battery pack 22 changes in accordance with the current value of the motor 14, the output voltage of the battery pack 22, too, can be the index corresponding to the load. Of course, the motor driver 38 can directly measure the load applied to the tool and then change the conduction angle based on the measured value. As described hereinafter, in the present embodiment the conduction angle is changed in accordance with the current value of the motor 14.

The motor driver 38 of the present embodiment is described hereinafter in detail; however, the structure and operations of the motor driver 38 are not limited to the specific examples described below.

The motor driver 38 has a three-phase inverter circuit 40 and a controller 70 that controls the three-phase inverter circuit 40. The three-phase inverter circuit 40 has first to sixth switching elements 41 to 46. The first switching element 41 is provided between the positive electrode 22a of the battery pack 22 and the U-phase terminal 14U of the motor 14. The second switching element 42 is provided between the positive electrode 22a of the battery pack 22 and the V-phase terminal 14V of the motor 14. The third switching element 43 is provided between the positive electrode 22a of the battery pack 22 and the W-phase terminal 14W of the motor 14. The fourth switching element 44 is provided between a PGND and the U-phase terminal 14U of the motor 14. The fifth switching element 45 is provided between the PGND and the V-phase terminal 14V of the motor 14. The sixth switching element 46 is provided between the PGND and the W-phase terminal 14W of the motor 14.

Si semiconductors or GaN (gallium nitride) semiconductor transistors are employed as the switching elements 41 to 46. Note that other III-V semiconductor transistors can be employed as the switching elements 41 to 46. Alternatively, SiC (silicon carbide) semiconductor transistors may be employed as the switching elements 41 to 46. Not only these semiconductor transistors but also various types of other semiconductor switches can be employed as the switching elements 41 to 46.

A PGND of the three-phase inverter circuit 40 is connected to the negative electrode 22b of the battery pack 22 via a cutoff switch 48 and a shunt resistance 50. The cutoff switch 48 is a n-channel field effect transistor (FET). The cutoff switch 48 is connected to the controller 70 and controlled by the controller 70. For instance, when the user turns the trigger switch 16 off, the cutoff switch 48 is turned off as well. As a result, regardless of the state of the three-phase inverter circuit 40, the motor 14 is electrically disconnected from the battery pack 22. In this circuit configuration, because the trigger switch 16 can be released from a motor current supply path, loss due to contact resistance of the trigger switch 16 can be eliminated. In addition, the controller 70 of the present embodiment turns the first to third switching elements 41 to 43 on when the cutoff switch 48 is turned off, and short-circuit the coil of the motor 14 and thereby applies a brake to the motor 14.

In the present embodiment, a drain terminal 48a of the cutoff switch 48 is connected to a 5-volt voltage terminal via a resistive element 52, for the purpose of failure diagnosis of the cutoff switch 48. Furthermore, the voltage of the drain terminal 48a is monitored by the controller 70. The controller 70 can determine a normal/abnormal state of the cutoff switch 48 by turning the cutoff switch 48 on/off and detecting the voltage of the drain terminal 48a.

The motor driver 38 has a current detection circuit 54 and a voltage detection circuit 60. The current detection circuit 54 can detect a current flowing through the motor 14 (motor current), based on the voltage generated in the shunt resistance 50. The voltage detection circuit 60 can detect an output voltage of the battery pack 22 (battery voltage). The values detected by the current detection circuit 54 and the voltage detection circuit 60 are input to the controller 70.

The motor driver 38 has a rotor position detection circuit 56 and a rotor speed computing circuit 58. The rotor position detection circuit 56 is connected to the position sensor 15 of the motor 14 and detects a rotor rotational position of the motor 14 based on an output signal from the position sensor 15. The value detected by the rotor position detection circuit 56 is input to the rotor speed computing circuit 58 and the controller 70. The rotor speed computing circuit 58 calculates a rotor rotational speed of the motor 14 based on the value detected by the rotor position detection circuit 56. The value computed by the rotor speed computing circuit 58 is input to the controller 70.

The motor driver 38 has a temperature sensor 62 and a temperature detection circuit 64. The temperature sensor 62 is disposed in the vicinity of the cutoff switch 48, and outputs a signal corresponding to the temperature of the cutoff switch 48 to the temperature detection circuit 64. The temperature detection circuit 64 detects the temperature of the cutoff switch 48 based on the output signal from the temperature sensor 62. The detected temperature of the cutoff switch 48 is reported to the controller 70. Note that the temperature sensor 62 may be disposed in the vicinity of the three-phase inverter circuit 40, the controller 70, or the motor 14.

The controller 70 has a gate drive circuit 72, a PWM signal generating unit 74, and an overcurrent detector 76. The gate drive circuit 72 is connected to gates of the switching elements 41 to 46. The gate drive circuit 72 selectively outputs an ON signal to the switching elements 41 to 46 in accordance with the detected rotor rotational position. As a result, each of the phase terminals 14U, 14V, 14W of the motor 14 is selectively connected to the positive electrode 22a or negative electrode 22b of the battery pack 22. The PWM signal generating unit 74 generates a pulse-width modulation (PWM) signal in accordance with the level of operation on the trigger switch 16. The gate drive circuit 72 controls the PWM of each of the switching elements 41 to 46 in response to the PWM signal generated by the PWM signal generating unit 74. As a result, the substantial value of voltage applied to the motor 14 is adjusted based on the level of operation on the trigger switch 16.

The overcurrent detector 76 stores a limiting value for the current of the motor 14. For example, the limiting value is set at 60 amperes in the present embodiment. The overcurrent detector 76 detects an overcurrent in the motor 14 by comparing the detected current value of the motor 14 with the limiting value. The result of detection by the overcurrent detector 76 is input to the gate drive circuit 72. When an overcurrent in the motor 14 is detected, the gate drive circuit 72 reduces a duty ratio of the motor 14. This can prevent the motor 14 from being locked and from burning out.

The controller 70 further has a lead angle/conduction angle determination unit 78 and a storage unit 80. The lead angle/conduction angle determination unit 78 determines the conduction angle and lead angle based on the value detected by the current detection circuit 54. As described above, the conduction angle is determined to be 120 degrees or 150 degrees, and the lead angle is determined based on this conduction angle. For example, in the present embodiment, the lead angle is set at 22.5 degrees with respect to the 120-degree conduction angle and at 30 degrees with respect to the 150-degree conduction angle. Data, such as the options in the conduction angle (120 degrees and 150 degrees in the present embodiment), the value of the lead angle with respect to each conduction angle, and first and second threshold values to be described hereinafter, are stored in the storage unit 80 in advance. The lead angle/conduction angle determination unit 78 executes a process for determining the conduction angle and lead angle based on these data stored in the storage unit 80. The data stored in the storage unit 80 may appropriately be set in accordance with the configuration, use application, and function of the electric power tool (the circular saw 10 in this embodiment).

Figure 7:
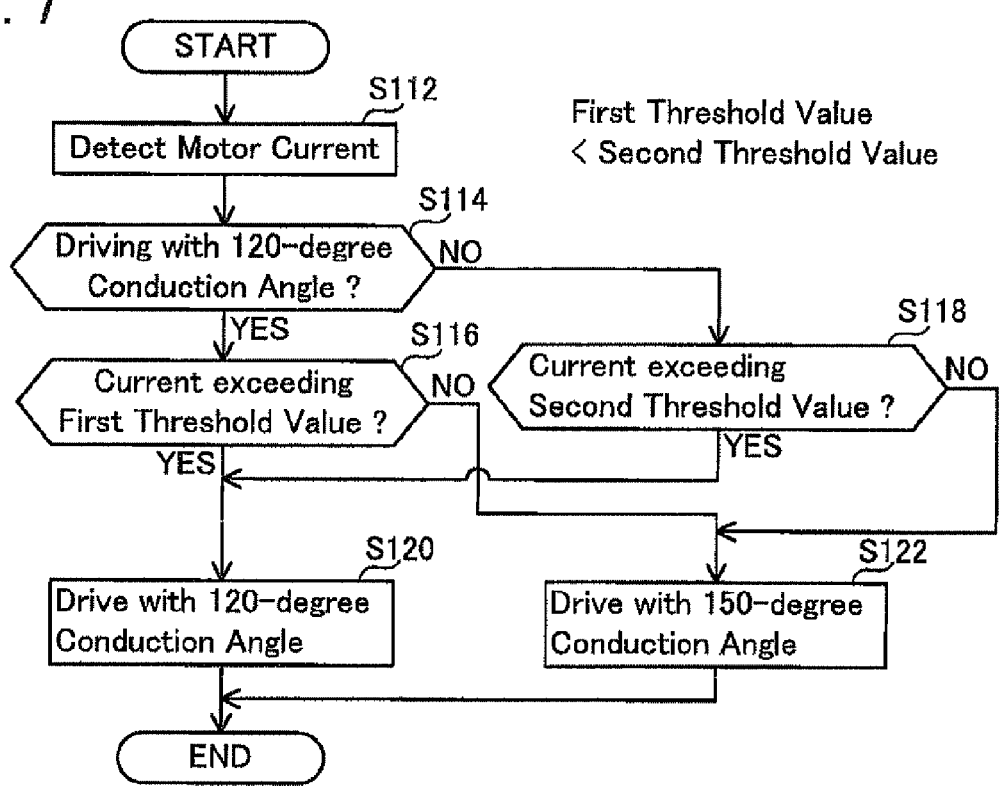
FIG. 7 is a flowchart showing a process for determining the conduction angle based on a current value of a motor.

FIG. 7 is a flowchart showing the process for determining the conduction angle. The process shown in FIG. 7 is executed mainly by the lead angle/conduction angle determination unit 78 of the controller 70. As shown in FIG. 7, first the current value of the motor 14 is detected based on the value detected by the current detection circuit 54 (step S112). When the conduction angle at this moment is 120 degrees (YES in step S114), the detected current value is compared with the first threshold value (step S116). When the detected current value exceeds the first threshold value (YES in step S116), the conduction angle is kept at 120 degrees (step S120), When, on the other hand, the detected current value is equal to or lower than the first threshold value (NO in step S116), the conduction angle is changed to 150 degrees (step S122). At this moment, the lead angle, too, is changed at the same time from 22.5 degrees to 30 degrees.

When the conduction angle at this moment is 150 degrees (NO in step S114), the detected current value is compared with the second threshold value (step S118). When the detected current value exceeds the second threshold value (YES in step S118), the conduction angle is changed to 120 degrees (step S120). At this moment, the lead angle, too, is changed at the same time from 30 degrees to 22.5 degrees. When the detected current value is equal to or lower than the second threshold value (NO in step S118), the conduction angle is kept at 150 degrees (step S122).

As described above, different threshold values are applied for determining whether the conduction angle needs to be changed from 120 degrees to 150 degrees and whether the conduction angle needs to be changed from 150 degrees to 120 degrees. Here, with respect to the current value of the motor 14, the first threshold value needs to be lower than the second threshold value. This can consequently provide hysteresis characteristics to the process for changing the conduction angle, so that the conduction angle can be prevented from being repeatedly changed unnecessarily even when the detected current value finely fluctuates around the threshold value. Although the first threshold value and the second threshold value are not particularly limited, in the present embodiment the first threshold value is set at 10 amperes and the second threshold value at 15 amperes.

Figure 8:
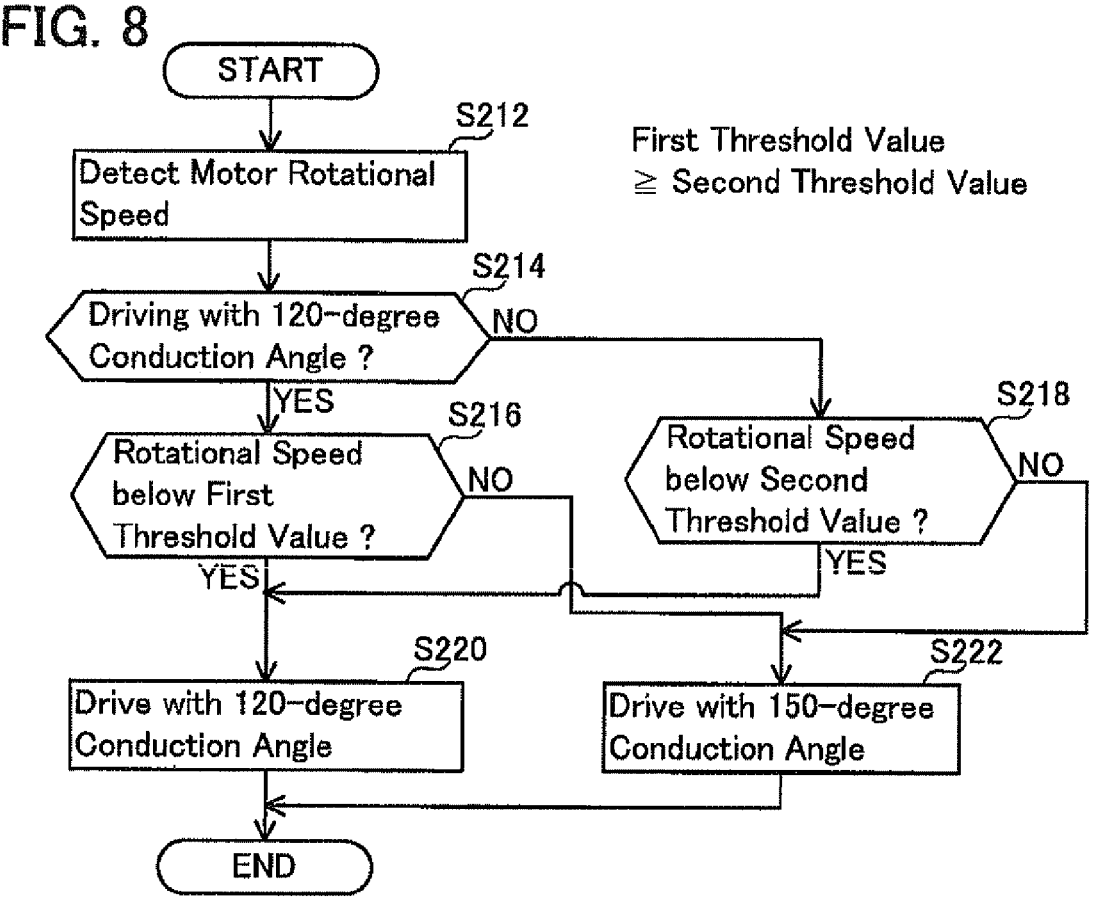
FIG. 8 is a flowchart showing a process for determining the conduction angle based on the rotational speed of the motor.

As described above, another index corresponding to a load applied to the saw blade 30 can be used in the process for changing the conduction angle. FIG. 8 shows an example in which the rotational speed of the motor 14 is used in place of the current value of the motor 14. In the process shown in FIG. 8, first the rotational speed of the motor 14 is detected based on the result of computation performed by the rotor speed computing circuit 58 (step S212). When the conduction angle at this moment is 120 degrees (YES in step S214), the detected rotational speed is compared with the first threshold value (step S216). When the detected rotational speed is lower than the first threshold value (YES in step S216), the conduction angle is kept at 120 degrees (step S220). When the detected rotational speed is equal to or greater than the first threshold value (NO in step S216), the conduction angle is changed to 150 degrees (step S222). At this moment, the lead angle, too, is changed at the same time from 22.5 degrees to 30 degrees.

When the conduction angle at this moment is 150 degrees (NO in step S214), the detected rotational speed is compared with the second threshold value (step S218). When the detected rotational speed is lower than the second threshold value (YES in step S218), the conduction angle is changed to 120 degrees (step S220). At this moment, the lead angle, too, is changed at the same time from 30 degrees to 22.5 degrees. When, on the other hand, the detected rotational speed is equal to or greater than the second threshold value (NO in step S218), the conduction angle is kept at 150 degrees (step S222). In the case where the rotational speed of the motor 14 is used in this manner, different threshold values are applied for determining whether the conduction angle needs to be changed from 120 degrees to 150 degrees and whether the conduction angle needs to be changed from 150 degrees to 120 degrees. Here, with respect to the rotational speed of the motor 14, the first threshold value needs to be equal to or greater than the second threshold value.

Figure 9:
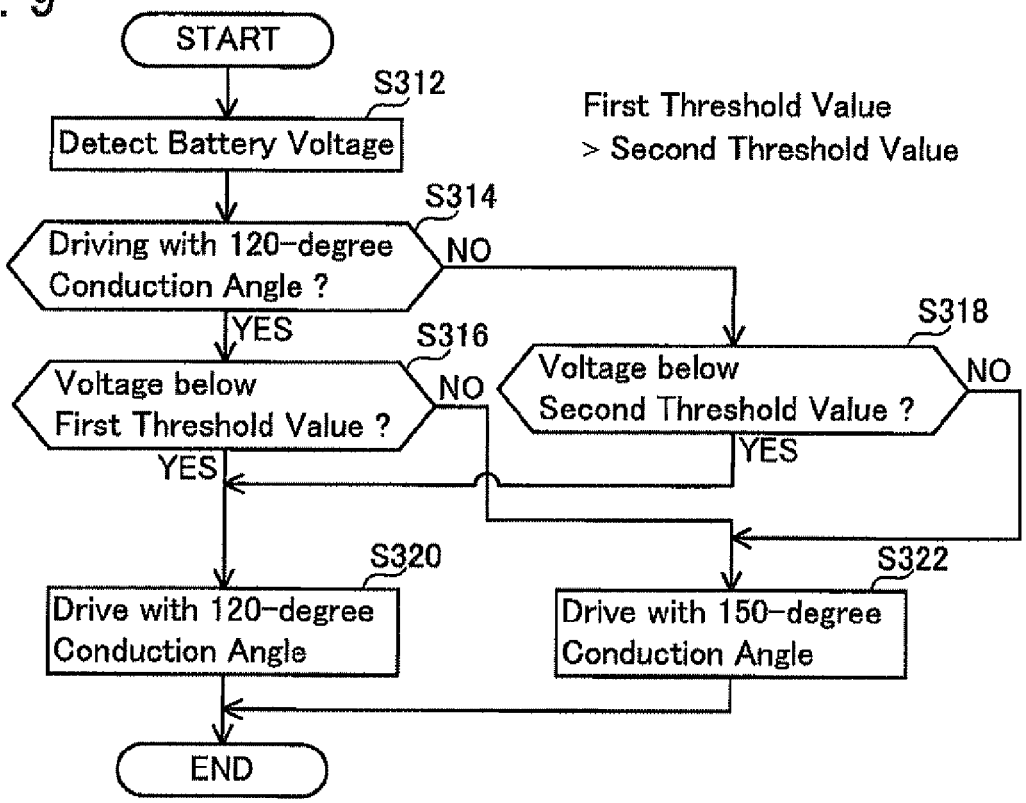
FIG. 9 is a flowchart showing a process for determining the conduction angle based on a voltage value of a battery pack.

FIG. 9 shows an example in which a voltage value of the battery pack 22 is used in place of the current value and rotational speed of the motor 14. In the process shown in FIG. 9, first a voltage value of the battery pack 22 is detected based on the value detected by the voltage detection circuit 60 (step S312). When the conduction angle at this moment is 120 degrees (YES in step S314), the detected voltage value is compared with the first threshold value (step S316), When the detected voltage value is lower than the first threshold value (YES in step S316), the conduction angle is kept at 120 degrees (step S320). When the detected voltage value is equal to or greater than the first threshold value (NO in step S316), the conduction angle is changed to 150 degrees (step S322). At this moment, the lead angle, too, is changed at the same time from 22.5 degrees to 30 degrees.

On the other hand, when the conduction angle at this moment is 150 degrees (NO in step S314), the detected voltage value is compared with the second threshold value (step S318). When the detected voltage value is lower than the second threshold value (YES in step S318), the conduction angle is changed to 120 degrees (step S320). At this moment, the lead angle, too, is changed at the same time from 30 degrees to 22.5 degrees. When the detected voltage value is equal to or greater than the second threshold value (NO in step S318), the conduction angle is kept at 150 degrees (step S322). In the case where the voltage value of the battery pack 22 is used in this manner, different threshold values can be applied for determining whether the conduction angle needs to be changed from 120 degrees to 150 degrees and whether the conduction angle needs to be changed from 150 degrees to 120 degrees. Here, with respect to the voltage value of the battery pack 22, the first threshold value needs to be greater than the second threshold value.

In addition, in the circular saw 10 of the present embodiment, the conduction angle is changed in accordance with the temperature detected by the temperature sensor 62 as well. As show in FIG. 5, when the circular saw 10 is run with no load (idled) with the 120-degree conduction angle, the motor 14 rotates at 21,200 rpm (revolution per minute), and the current value of the motor 14 is 1.51 A. However, when the circular saw 10 is run with no load (idled) with the 150-degree conduction angle, the motor 14 rotates at 34,800 rpm, and the current value of the motor 14 increases to 7.0 A. Increasing the conduction angle in this manner leads to a significant increase in the current value upon no-load running and hence possible overheating of the motor 14 and the motor driver 38. For this reason, the circular saw 10 of the present embodiment is configured to change the conduction angle from 150 degrees to 120 degrees when the temperature of the motor 14 or the motor driver 38 rises.

Figure 10:
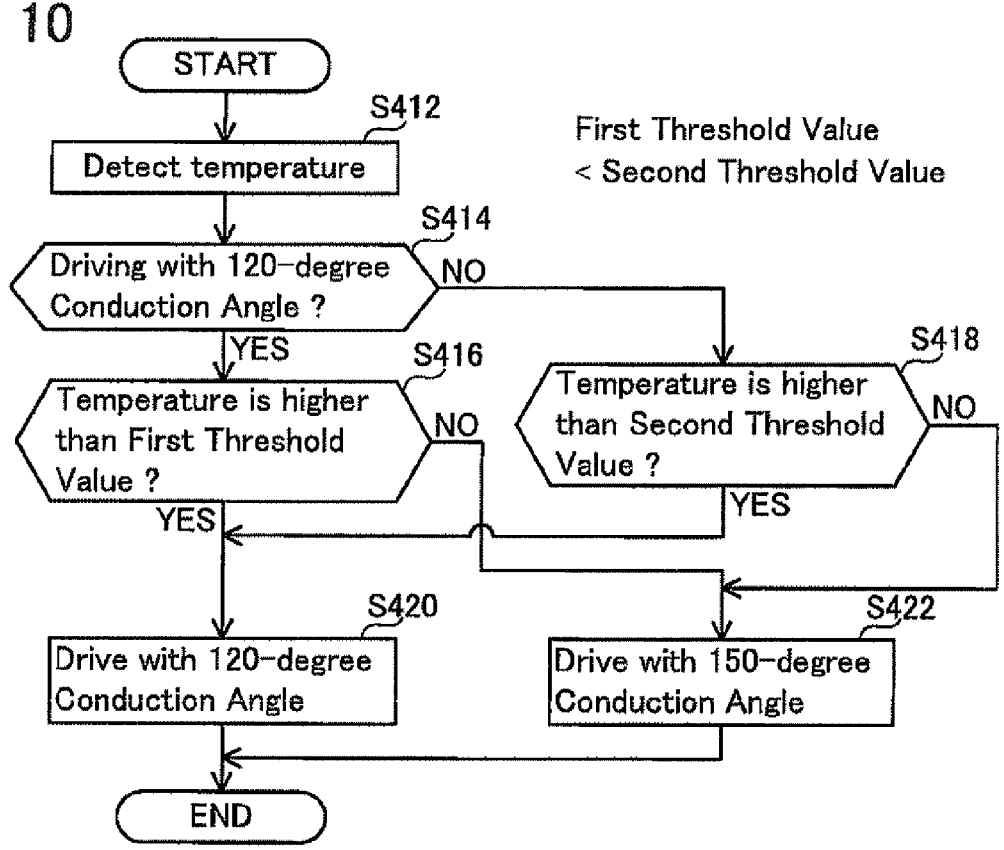
FIG. 10 is a flowchart showing a process for determining the conduction angle based on the temperature of a cutoff switch.

FIG. 10 is a flowchart of the process described above, which is a process for changing the conduction angle in accordance with the temperature detected by the temperature sensor 62. In the process shown in FIG. 10, first the temperature of the cutoff switch 48 is detected by the temperature sensor 62 and the temperature detection circuit 64 (step S412). When the conduction angle at this moment is 120 degrees (YES in step S414), the detected temperature is compared with the first threshold value (step S416). When the detected temperature is greater than the first threshold value (YES in step S416), the conduction angle is kept at 120 degrees (step S420). When the detected temperature is equal to or lower than the first threshold value (NO in step S416), the conduction angle is changed to 150 degrees (step S422). At this moment, the lead angle, too, is changed at the same time from 22.5 degrees to 30 degrees.

When, on the other hand, the conduction angle at this moment is 150 degrees (NO in step S414), the detected temperature is compared with the second threshold value (step S418). When the detected temperature is greater than the second threshold value (YES in step S418), the conduction angle is changed to 120 degrees (step S420). At this moment, the lead angle, too, is changed at the same time from 30 degrees to 22.5 degrees. When the detected temperature is equal to or greater than the second threshold value (NO in step S418), the conduction angle is kept at 150 degrees (step S422). When the temperature of the cutoff switch 48 increases abnormally, the conduction angle is changed from 150 degrees to 120 degrees so that the current value of the motor 14 drops. In this process as well, different threshold values can be applied for determining whether the conduction angle needs to be changed from 120 degrees to 150 degrees and whether the conduction angle needs to be changed from 150 degrees to 120 degrees. Here, with respect to the temperature, the first threshold value needs to be smaller than the second threshold value.

Figure 11:
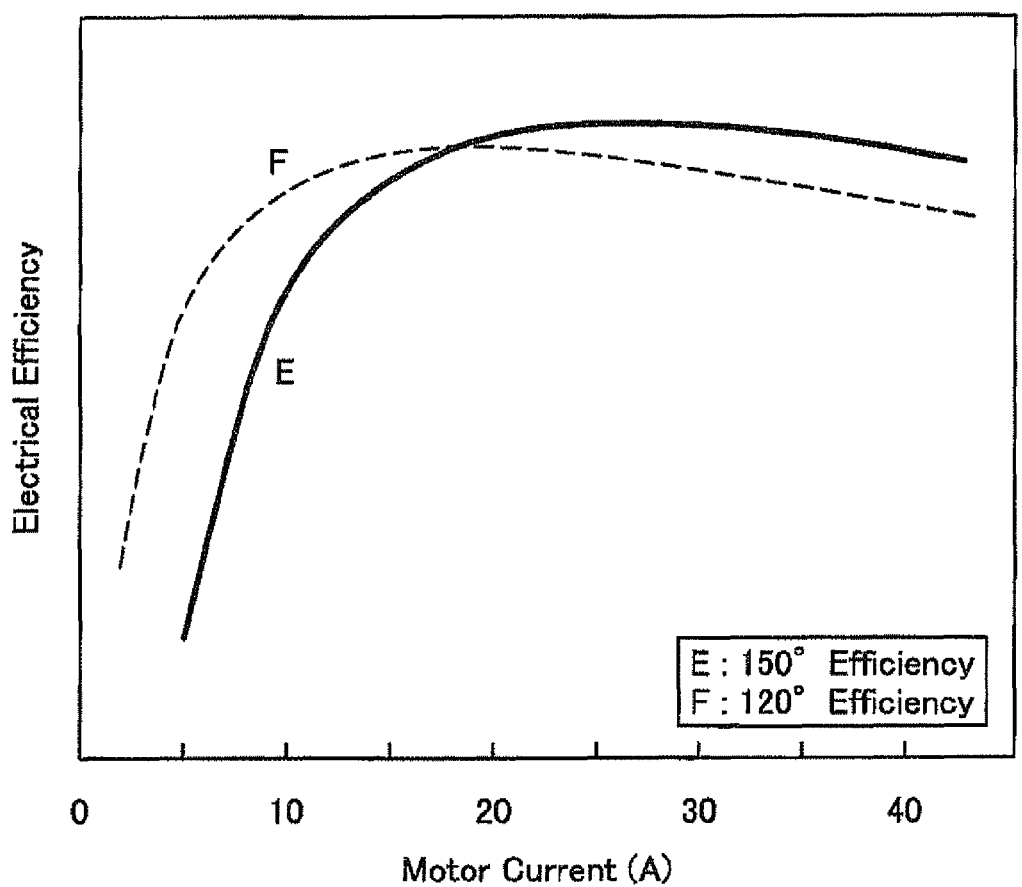
FIG. 11 is a graph showing a relationship between conduction angle and electrical efficiency, wherein line E represents the electrical efficiency obtained when the conduction angle is 150 degrees, and line F the electrical efficiency obtained when the conduction angle is 120 degrees.

In the present embodiment, the output of the electric power tool is improved by changing the conduction angle. In another embodiment, on the other hand, the electrical efficiency of the electric power tool can be improved by changing the conduction angle. FIG. 11 is a graph showing a relationship between the conduction angle and the electrical efficiency. As shown in FIG. 11, when the motor current is relatively low, the electrical efficiency can be improved by setting the conduction angle at 120 degrees, and when the motor current is relatively high, the electrical efficiency can be improved by setting the conduction angle at 150 degrees. This means that the electric power tool can constantly be run at high electrical efficiency by setting the conduction angle at 120 degrees when the motor current is relatively low and by setting the conduction angle at 150 degrees when the motor current is relatively high. Here, the motor current corresponds to a load applied to the tool. Thus, when improving the electrical efficiency, the greater the load applied to the tool, the higher the value at which the conduction angle is set. This means that the process opposite to the one for improving the output shown in FIGS. 7, 8 and 9 is executed.

In relation to what is described above, in another embodiment, it is effective to configure the motor driver 38 in such a manner as to be able to select between "a high power mode where the conduction angle is set at a larger value as a load applied to the tool becomes smaller" and "an energy saving mode where the conduction angle is set at a larger value as a load applied to the tool becomes greater". In this case, it is effective that the motor driver 38 select between these two modes in accordance with the charge level of the battery pack 22. In other words, while the battery pack 22 is sufficiently charged, the electric power tool is preferably run in the "high power mode," and when the charge level of the battery pack 22 drops to a predetermined level, the mode is preferably switched to the "energy saving mode." The charge level of the battery pack 22 can be estimated based on, for example, the voltage of the battery pack 22 detected by the voltage detection circuit 60. The motor drier 38, therefore, can appropriately select between these two modes in accordance with the value detected by the voltage detection circuit 60.

Embodiment 2

Figure 12:
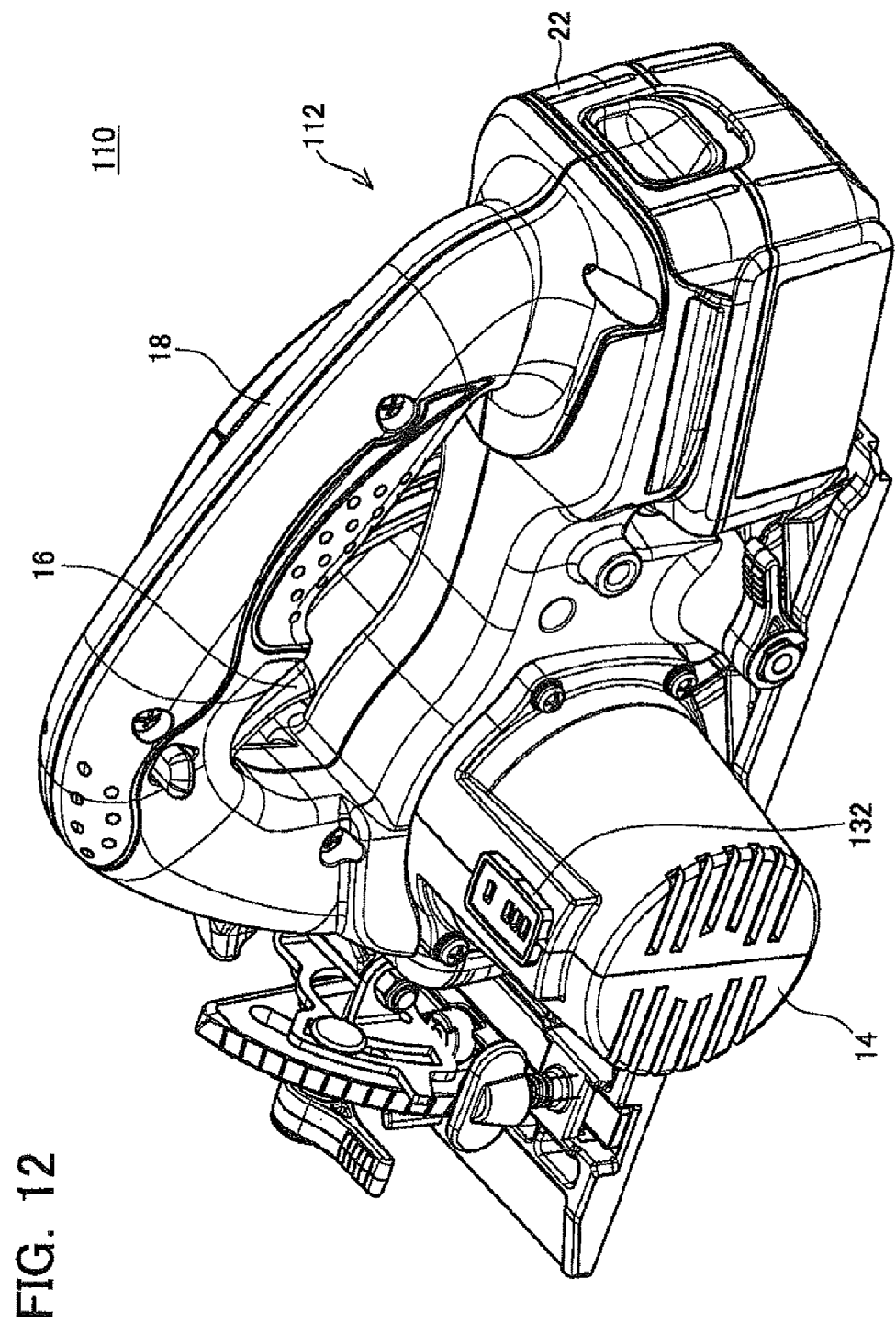
FIG. 12 is a perspective view showing the exterior of a circular saw according to Embodiment 2.
Figure 13:
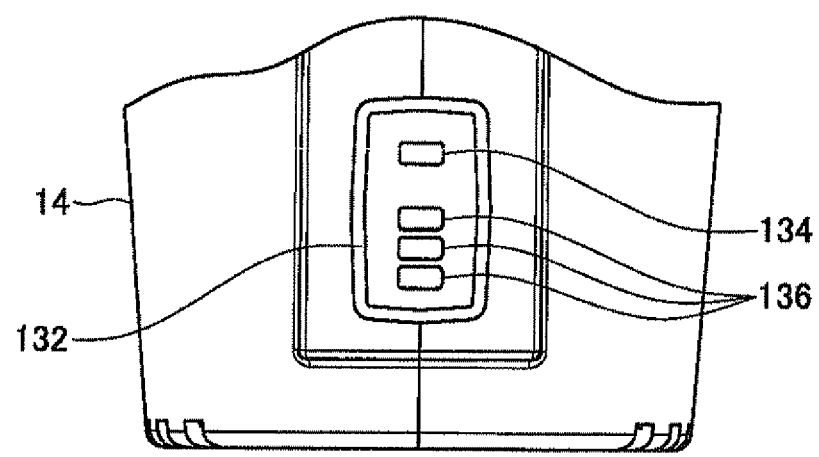
FIG. 13 is a plan view showing a display unit.

An electric power tool 110 of Embodiment 2 is described with reference to the drawings. Unlike the electric power tool 10 of Embodiment 1, the electric power tool 110 of the present embodiment further has a display unit 132 provided in its main body 112, as shown in FIG. 12. The other configurations of the electric power tool 110 are the same as those of the electric power tool 10 of Embodiment 1. Thus, the overlapping explanation thereof is omitted by incorporating the description of Embodiment 1.

The display unit 132 is an example of the notifier and is capable of notifying the user of various types of information. The display unit 132 has a plurality of LEDs, including a mode display LED 134 and gauge display LEDs 136. The display unit 132 displays various types of information to be notified to the user, by selectively activating one or plurality of LEDs 134, 136. Note that the display unit 132 can have another illuminator or a liquid crystal display panel in place of or in addition to these LEDs. The configuration of the display unit 132 is not particularly limited.

Figure 14:
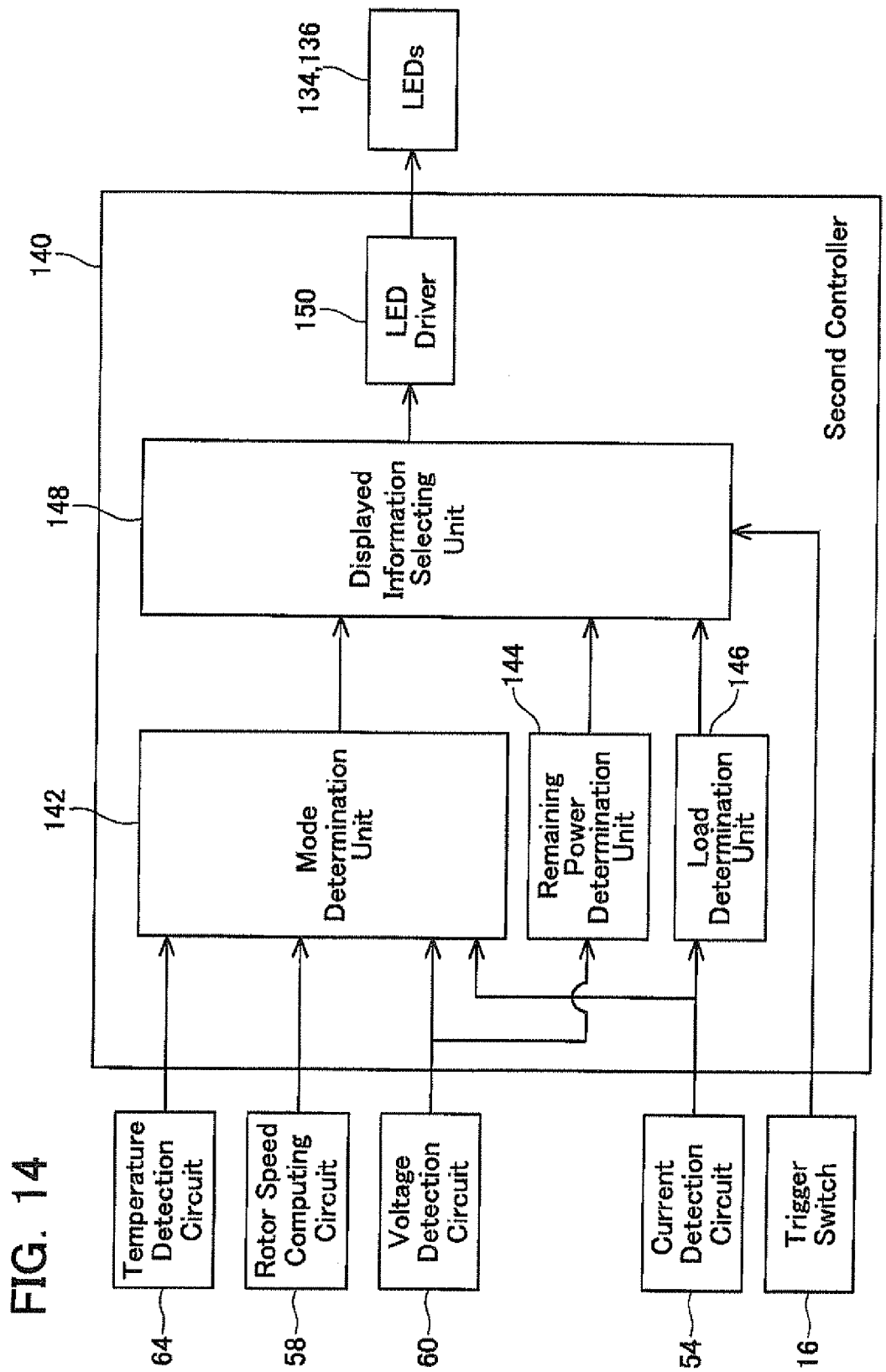
FIG. 14 is a block diagram showing a functional configuration of the circular saw according to Embodiment 2.

As shown in FIG. 14, the electric power tool 110 of the present embodiment has a second controller 140 that drives the LEDs 134, 136 of the display unit 132. The second controller 140 is configured using a microprocessor (or a microcomputer). As with the controller 70 described in Embodiment 1 (referred to as "first controller 70," hereinafter) (see FIG. 2), the second controller 140 is electrically connected to the temperature detection circuit 64, the rotor speed computing circuit 58, the voltage detection circuit 60, the current detection circuit 54, and the trigger switch 16. Note that the first and second controllers 70 and 140 can be configured using the same microprocessor (or microcomputer).

The second controller 140 has a mode determination unit 142, a remaining power determination unit 144, a load determination unit 146, a displayed information selecting unit 148, and a LED driver 150. The mode determination unit 142 identifies the conduction angle set by the first controller 70, based on the value detected by the current detection circuit 54. As described above, the first controller 70 stores the first and second threshold values for the value detected by the current detection circuit 54 and sets the conduction angle at 150 degrees or 120 degrees based on the magnitude relationship between the detected value and the two threshold values (see FIG. 7). Thus, the mode determination unit 142, too, stores the same first and second threshold values and determines the conduction angle to be set by the first controller 70, based on the magnitude relationship between the value detected by the current detection circuit 54 and the two stored threshold values. Accordingly, the second controller 140 uniquely identifies the conduction angle to be set by the first controller 70, regardless of the conduction angle that is actually set. The result of determination by the second controller 140 is sent to the displayed information selecting unit 148.

As described above, the mode determination unit 142 identifies the conduction angle set by the first controller 70, in accordance with the current value of the motor 14. The current value of the motor 14 here means an index corresponding to a load applied to the saw blade 30 which is the tool. Therefore, when identifying the conduction angle set by the first controller 70, the mode determination unit 142 may use another index corresponding to the load applied to the saw blade 30, in place of the current value of the motor 14. Examples of this index to be used include the rotational speed of the motor 14, the voltage value of the battery pack 22, and the temperature of the motor 14 or the motor driver 38.

The remaining power determination unit 144 determines the remaining power (charge level) of the battery pack 22 based on the value detected by the voltage detection circuit 60 (i.e., the voltage value of the battery pack 22). The result of determination made by the remaining power determination unit 144 is sent to the displayed information selecting unit 148. Note that the remaining power determination unit 144 may determine the remaining power of the battery pack 22 based on another index other than the voltage value of the battery pack 22.

The load determination unit 146 determines a tool load (the load applied to the band saw 30) based on the value detected by the current detection circuit 54 (i.e., the current value of the motor 14). The result of determination made by the load determination unit 146 is sent to the displayed information selecting unit 148. Note that the load determination unit 146 may determine the tool load based on another index other than the current value of the motor 14.

The displayed information selecting unit 148 selects information to be displayed on the display unit 132, from among the information sent from the mode determination unit 142, the remaining power determination unit 144, and the load determination unit 146. The displayed information selecting unit 148 is electrically connected to the trigger switch 16 and selects the information to be displayed, in response to an operation performed on the trigger switch 16. This feature is described hereinafter with reference to FIG. 18. The selected information is sent to the LED driver 150. Based on the received information, the LED driver 150 selectively activates the LEDs 134, 136 of the display unit 132. Consequently, the display unit 132 selectively displays the information on the conduction angle (i.e., information on the operating mode), the information on the remaining power of the battery pack 22, and the information on the tool load.

Figure 15A:
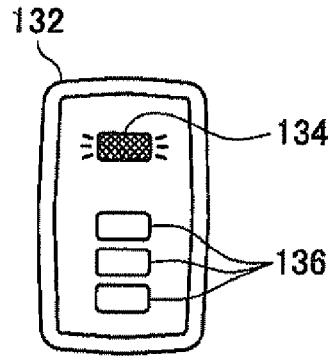
Figure 15B:
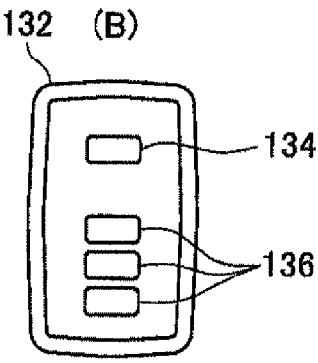

FIG. 15 shows an example of how the conduction angle is displayed. When the conduction angle is 150 degrees, the mode display LED 134 is activated, as shown in FIG. 15A. When, on the other hand, the conduction angle is 120 degrees, the mode display LED 134 is deactivated, as shown in FIG. 15B. The user can therefore know that the current conduction angle is 150 degrees or 120 degrees, based on whether the mode display LED 134 is activated or not.

Figure 16A:
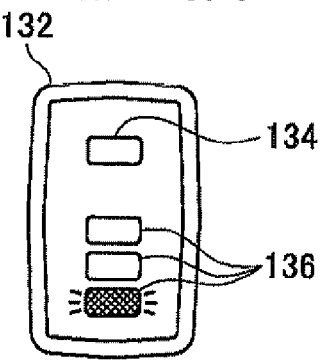
FIGS. 16A to 16C show an example of how a load applied to a tool is displayed by the display unit, the load displayed by the display unit increasing gradually from the state shown in FIG. 16A to the state shown in FIG. 16C.
Figure 16B:
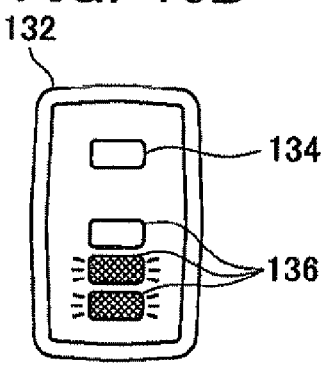
Figure 16C:
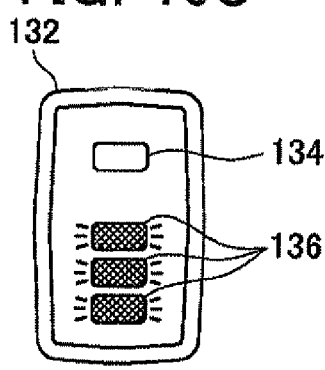

FIG. 16 shows an example of how the remaining power of the battery pack 22 is displayed. As shown in FIGS. 16A to 16C, the remaining power of the battery pack 22 is displayed by the gauge display LEDs 136. FIG. 16A displays a small remaining power of the battery pack 22. FIG. 16B shows a half remaining power of the battery pack 22. FIG. 16C shows a large remaining power of the battery pack 22. The more the gauge display LEDs 136 are activated, the larger the remaining power of the battery pack 22 is.

Figure 17A:
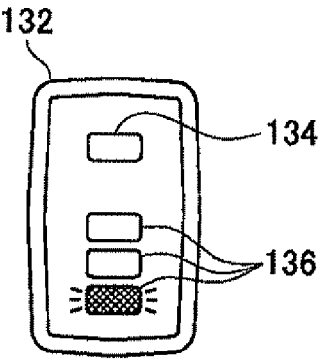
FIGS. 17A to 17C show an example of how remaining power (charge level) of the battery pack is displayed by the display unit, the remaining power displayed by the display unit increasing gradually from the state shown in FIG. 17A to the state shown in FIG. 17C.
Figure 17B:
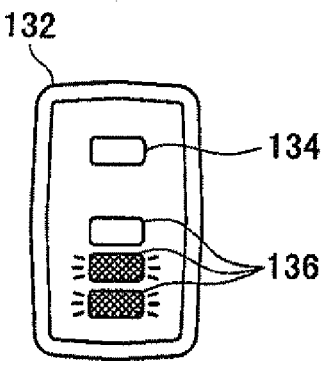
Figure 17C:
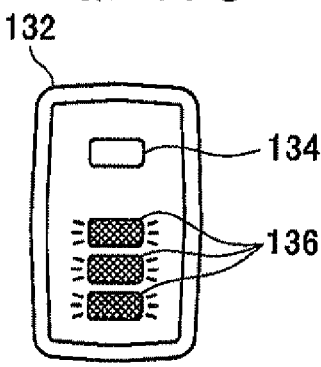

FIG. 17 shows an example of how the tool load is displayed. As shown in FIGS. 17A to 17C, the tool load is displayed by the gauge display LEDs 136. FIG. 17A shows a small tool load. FIG. 17B shows a medium tool load. FIG. 17C shows a large tool load. The more the gauge display LEDs 136 are activated, the greater the tool load is.

Figure 18:
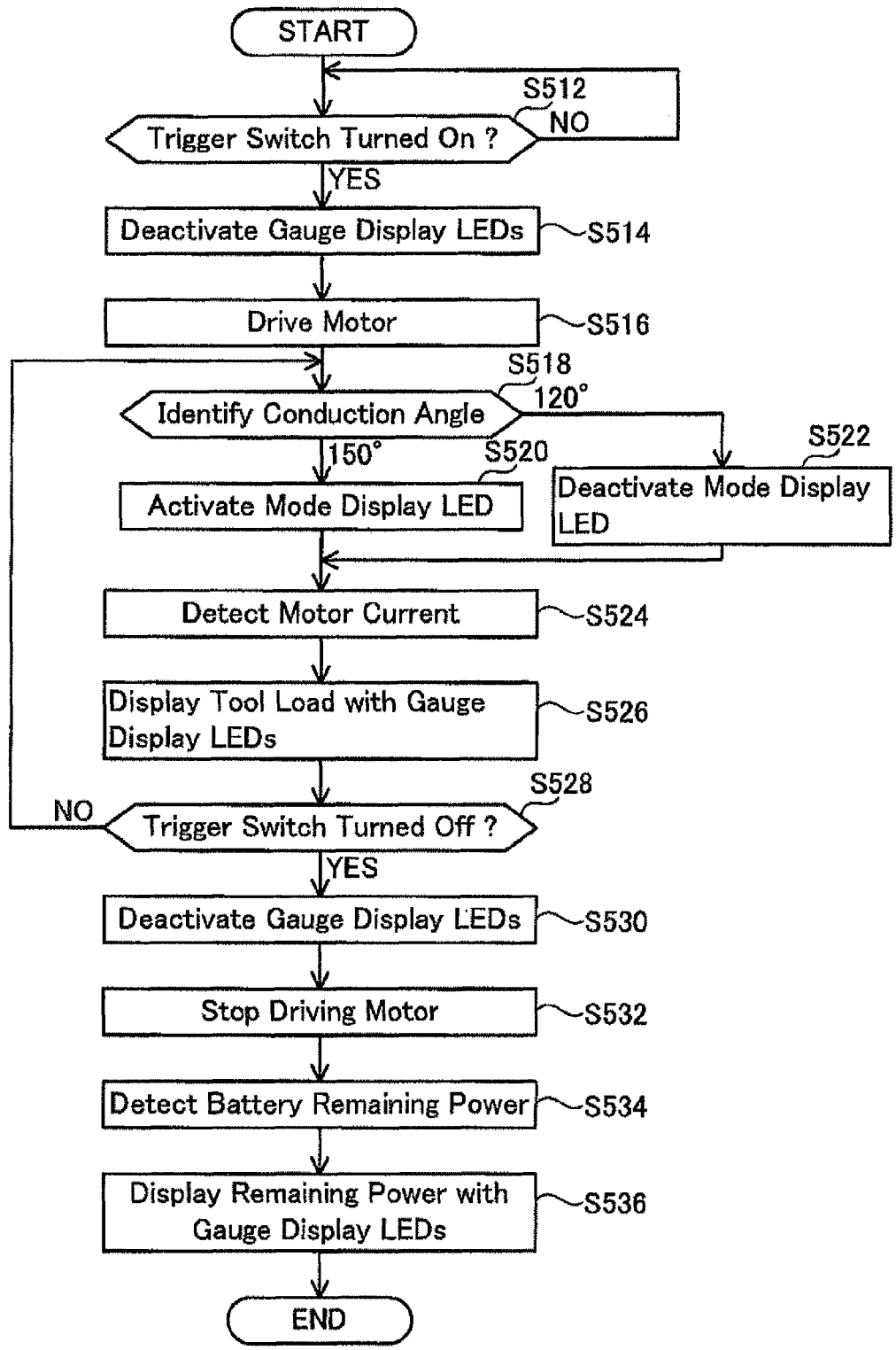
FIG. 18 is a flowchart for explaining the flow of operations of the display unit.

FIG. 18 is a flowchart showing operations of the display unit 132. The operations of the display unit 132 are described with reference to FIG. 18. First, when the user turns the trigger switch 16 on (YES in step S512), the gauge display LEDs 136 are deactivated (step S514). Next, the first controller 70 starts driving the motor 14. The second controller 140 identifies the conduction angle (step S518). When the conduction angle is 150 degrees, the mode display LED is activated (step S520). When the conduction angle is 120 degrees, the mode display LED is deactivated (step S522). Further, the current value of the motor 14 is detected (step S526). The second controller 140 determines the tool load, and then the tool load is displayed by the gauge display LEDs (step S526). These operations are executed repeatedly until the trigger switch 16 is turned off (step S528).

When the trigger switch 16 is turned off (YES in step S528), the gauge display LEDs 136 are deactivated (step S530), and the drive of the motor 14 is stopped (step S532). Thereafter, the second controller 140 determines the remaining power of the battery pack 22 (step S534), and then this remaining power is displayed by the gauge display LEDs 136 (step S536). In this manner, while the trigger switch 16 is on, the display unit 132 displays the set conduction angle (i.e., the operating mode) and the load applied to the tool. Then, when the trigger switch 16 is turned off, the display unit 132 displays the remaining power of the battery pack 22.

The display method of the display unit 132 is not limited to the specific example described above. FIGS. 19A to 19H, for example, show the other examples of how the tool load is displayed. When the tool load is lower than an intermediate value, the mode display LED 134 is activated, as shown in FIGS. 19A to 19D. Within this range, the three gauge display LEDs 136 display the intensity of the tool load in stages. When the tool load is greater than the intermediate value, the mode display LED 134 is deactivated, as shown in FIGS. 19E to 19G. Within this range, the three gauge display LEDs 136 display the intensity of the tool load in stages. When the tool load is excessively high, the three gauge display LEDs 136 may be flashed, as shown in FIG. 19H. FIGS. 19 and 20 show that half of each of the LEDs 134, 136 with hatched lines is flashed.

FIGS. 20A to 20H show other examples of how the tool load is displayed. These display examples show three states, the deactivate state, the flashed state, and the activated state, of each of the gauge display LEDs 136. Thus, eight different intensities (or multiple intensities) of the tool load can be displayed by using only the three gauge display LEDs, as shown in FIGS. 20A to 20H.

Specific embodiments of the present invention are described above, but they merely illustrate some possibilities of the teachings and do not restrict the claims thereof. The art set forth in the claims includes variations and modifications of the specific examples set forth above. The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

The invention claimed is:

1. An electric power tool comprising:
    a three-phase brushless motor configured to drive a tool; and
    a motor driver configured to drive the three-phase brushless motor with square voltage waves, wherein the motor driver is able to change a conduction angle among at least two values, the at least two values include a value that is equal to more than 130 degrees but not more than 180 degrees, and the motor driver is configured to set the conduction angle to a larger value as current flowing through the motor becomes smaller.

2. The electric power tool as in claim 1, wherein the motor driver is capable of selecting between "a high power mode where the conduction angle is set to a larger value as a load applied to the tool becomes smaller" and "an energy saving mode where the conduction angle is set to a larger value as a load applied to the tool becomes greater".

3. An electric power tool comprising:
    a three-phase brushless motor configured to drive a tool;
    a motor driver configured to drive the three-phase brushless motor with square voltage waves, wherein the motor driver is able to change a conduction angle among at least two values, the at least two values include a value that is equal to or more than 130 degrees but not more than 180 degrees, and
    a first detector that detects an index corresponding to a load applied to the tool,
    wherein the motor driver is configured to:
    change the conduction angle among at least a first angle and a second angle in accordance with a detected value by the first detector;
    store a first threshold value and a second threshold value for the index;
    change the conduction angle to the second angle in accordance with a magnitude relationship between the detected value by the first detector and the first threshold value when the conduction angle has been set to the first value; and
    change the conduction angle to the first angle in accordance with a magnitude relationship between the detected value by the first detector and the second threshold value when the conduction angle has been set to the second value.

4. An electric power tool comprising;
    a three-phase brushless motor configured to drive a tool;
    a motor driver configured to drive the three-phase brushless motor with square voltage waves, wherein the motor driver is able to change a conduction angle among at least two values, the at least two values include a value that is equal to or more than 130 degrees but not more than 180 degrees, and a second detector that detects a temperature of the three-phase brushless motor or the motor driver, wherein the motor driver is configured to change the conduction angle in accordance with a detected value by the second detector.

5. The electric power tool as in claim 4, wherein the motor driver is configured to:
   change the conduction angle among at least a first angle and a second angle;
   store a third threshold value and a fourth threshold value for the temperature;
   change the conduction angle to the second angle if the detected value by the second detector is higher than the third threshold value when the conduction angle has been set to the first value; and
   change the conduction angle to the first angle if the detected value by the second detector is lower than the fourth threshold value when the conduction angle has been set to the second value.

6. An electric power tool comprising:
   a three-phase brushless motor configured to drive a tool; and
   a motor configured to drive the three-phase motor with square voltage waves, wherein the motor driver is able to change a conduction angle among at least two values, the at least two values include a value that is equal to or more than 130 degrees but not more than 180 degrees,
   wherein, when the motor driver makes the conduction angle larger, the motor driver advances a timing to start conduction to an earlier timing while maintaining the conduction angle, and then increases the conduction angle while maintaining the timing to start conduction.

7. An electric power tool comprising:
   a three-phase brushless motor configured to drive a tool; and
   a motor driver configured to drive the three-phase brushless motor with square voltage waves, wherein the motor driver is able to change conduction angle among at least two values, the at least two values include a value that is equal to or more than 130 degrees but not more than 180 degrees,
   wherein, when the motor driver makes the conduction angle smaller, the motor driver decreases the conduction angle while maintaining a timing to start conduction, and then postpone the timing to start conduction to a later timing while maintaining the conduction angle.

8. An electric power tool comprising:
   a three-phase brushless motor configured to drive a tool; and
   motor driver configured to drive the three-phase brushless motor with square voltage waves, wherein the motor driver is able to change a conduction angle among at least two values, the at least two values include a value that is equal to or more than 130 degrees but not more than 180 degrees, and the motor is configured to further change a lead angle in accordance with a change in the conduction angle.

9. An electric power tool comprising:
   a three-phase brushless motor configured to drive a tool;
   a motor driver configured to drive the three-phase brushless motor with square voltage waves, wherein the motor driver is able to change a conduction angle among at least two values, the at least two values include a value that is equal to or more than 130 degrees but not more than 180 degrees, and a notifier configured to selectively perform a notification corresponding to the conduction angle set by the motor driver, wherein the notifier comprises at least one illuminator.

10. The electric power tool as in claim 9, wherein the notifier is configured to uniquely identify the conduction angle set by the motor driver regardless of the conduction angle that is actually set.

11. The electric power tool as in claim 9, further comprising a first detector that detects an index corresponding to a load applied to the tool, wherein
   the motor driver is configured to change the conduction angle in accordance with a detected value by the first detector, and
   the notifier is configured to select a notification to be performed in accordance with the detected value by the first detector.

12. The electric power tool as in claim 11, wherein
   the motor driver and the notifier are configured to store at least one threshold value for the index detected by the first detector,
   the motor driver is configured to change the conduction angle in accordance with a magnitude relationship between the detected value by the first detector and the at least one threshold value, and
   the notifier is configured to perform the notification corresponding to each conduction angle in accordance with the magnitude relationship between the detected value by the first detector and the at least one threshold value.

13. The electric power tool as in claim 11, wherein the notifier is capable of performing a notification indicative of a magnitude of the detected value by the first detector in accordance with the detected value by the first detector.

14. The electric power tool as in claim 9, further comprising:
   a battery configured to supply electric power to the three-phase brushless motor; and
   a third detector configured to detect remaining power of the battery,
   wherein the notifier is capable of further performing a notification corresponding to the remaining power of the battery detected by the third detector.

15. The electric power tool as in claim 14, wherein the notifier is configured to:
   perform the notification corresponding to the selected conduction angle while the motor is driven, and
   perform the notification corresponding to the remaining power of the battery when the driven motor is stopped.

16. The electric power tool as in claim 15, wherein the notifier is configured to further perform a notification indicative of a magnitude of the load applied to the tool while the motor is driven.

17. An electric power tool comprising:
   a three-phase brushless motor configured to drive a tool;
   a motor driver configured to drive the three-phase brushless motor with square voltage waves; and
   a notifier,
   wherein:
      the motor driver is capable of selectively performing a first mode where the motor driver outputs square voltage waves having a first relationship with respect to a rotational position of the motor and a second mode where the motor driver outputs square voltage waves having a second relationship with respect to the rotational position of the motor, the notifier is configured to selectively perform one of at least two kinds of notifications in accordance with which mode is selected by the motor driver, and
the notifier comprises at least one illuminator.

* * * * *